United States Patent
Zhang et al.

(10) Patent No.: US 10,553,890 B2
(45) Date of Patent: Feb. 4, 2020

(54) AQUEOUS REDOX FLOW BATTERIES

(71) Applicant: UCHICAGO ARGONNE, LLC, Chicago, IL (US)

(72) Inventors: Zhengcheng Zhang, Naperville, IL (US); Chi Cheung Su, Westmont, IL (US); Lei Cheng, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 222 days.

(21) Appl. No.: 15/631,239

(22) Filed: Jun. 23, 2017

(65) Prior Publication Data

US 2018/0375142 A1    Dec. 27, 2018

(51) Int. Cl.
    *H01M 8/18*       (2006.01)
    *H01M 8/04746*    (2016.01)
    *H01M 8/023*      (2016.01)

(52) U.S. Cl.
    CPC ........... *H01M 8/188* (2013.01); *H01M 8/023* (2013.01); *H01M 8/04753* (2013.01)

(58) Field of Classification Search
    None
    See application file for complete search history.

(56) References Cited

U.S. PATENT DOCUMENTS

| | | |
|---|---|---|
| 3,996,064 A | 12/1976 | Thaller |
| 4,362,791 A | 12/1982 | Kaneko et al. |
| 4,584,070 A | 4/1986 | DeLue et al. |
| 5,366,824 A | 11/1994 | Nozaki |
| 5,709,968 A | 1/1998 | Shimizu |
| 6,692,862 B1 | 2/2004 | Zocchi |
| 6,872,376 B2 | 3/2005 | Tanaka et al. |
| 7,258,947 B2 | 8/2007 | Kubata et al. |
| 7,320,844 B2 | 1/2008 | Skyllas-Kazacos |
| 8,003,260 B2 | 8/2011 | Exnar et al. |
| 8,968,885 B2 | 3/2015 | Brown et al. |
| 9,300,000 B2 | 3/2016 | Jansen et al. |
| 9,382,274 B2 * | 7/2016 | Esswein .................. C07F 7/28 |
| 2006/0199080 A1 | 9/2006 | Amine et al. |
| 2006/0263695 A1 | 11/2006 | Dahn et al. |

(Continued)

FOREIGN PATENT DOCUMENTS

| | | |
|---|---|---|
| EP | 2001091434 A1 | 4/2001 |
| WO | 200129920 A1 | 4/2001 |
| WO | 2011131959 A1 | 10/2011 |

OTHER PUBLICATIONS

Brushett, F.R. et al., An All-Organic Non-Aqueous Lithium-Ion Redox Flow Battery, Advanced Energy Materials, 1-7, (2012).

(Continued)

*Primary Examiner* — Karie O'Neill Apicella
(74) *Attorney, Agent, or Firm* — Olson & Cepuritis, Ltd.

(57) ABSTRACT

The present invention provides an aqueous redox flow battery comprising a negative electrode immersed in an aqueous liquid negative electrolyte, a positive electrode immersed in an aqueous liquid positive electrolyte, and a cation-permeable separator between the negative electrolyte from the positive electrolyte. During charging and discharging, the electrolytes are circulated over their respective electrodes. The electrolytes each comprise a redox reactant. Redox reactant of the positive electrolyte comprises a compound of Formula (I) as described in the specification.

6 Claims, 11 Drawing Sheets

(56) References Cited

U.S. PATENT DOCUMENTS

| | | |
|---|---|---|
| 2007/0092802 A1 | 4/2007 | Ahn et al. |
| 2008/0220335 A1 | 9/2008 | Casteel |
| 2008/0241643 A1 | 10/2008 | Lepp et al. |
| 2009/0017379 A1 | 1/2009 | Inatomi et al. |
| 2009/0176162 A1 | 7/2009 | Exnar et al. |
| 2010/0047671 A1 | 2/2010 | Chiang et al. |
| 2010/0237298 A1 | 9/2010 | Armand et al. |
| 2010/0297481 A1 | 11/2010 | Son et al. |
| 2010/0323264 A1 | 12/2010 | Chiang et al. |
| 2011/0052945 A1 | 3/2011 | Whitacre |
| 2011/0189549 A1 | 8/2011 | Sun et al. |
| 2011/0195283 A1 | 8/2011 | Sun et al. |
| 2011/0200848 A1 | 8/2011 | Chiang et al. |
| 2011/0294003 A1 | 12/2011 | Zhang et al. |
| 2011/0294017 A1 | 12/2011 | Weng et al. |
| 2012/0135278 A1 | 5/2012 | Yoshie et al. |
| 2013/0189571 A1 | 7/2013 | Abouimrane et al. |
| 2014/0170511 A1 | 6/2014 | Tolmachev |
| 2015/0372333 A1 | 12/2015 | Odom et al. |
| 2015/0380760 A1 | 12/2015 | Spaziante et al. |
| 2016/0013506 A1 | 1/2016 | Dong et al. |

OTHER PUBLICATIONS

Buhrmester C. et al., Studies of Aromatic Redox Shuttle Additives for LiFePO4-Based Li-Ion Cells, Journal of the Electrochemical Society, 152 (12) A2390-A2399 (2005).
Chakrabarti, M.H. et al., Evaluation of Electrolytes for Redox Flow Battery Applications, Electrochimica Acta, 52(5), 2189-2195 (2007).
Chen, Z. et al., Redox Shuttles for Safer Lithium-Ion Batteries, Electrochimica Acta, 54 (24), 5605-5613 (2009).
Crabtree, G. et al., Integrating Renewable Electricity on the Grid—A Report by the APS Panel on Public Affairs, American Physical Society, Washington, D.C. (2010).
Duduta, M. et al., Semi-Solid Lithium Rechargeable Flow Battery, Advanced Energy Materials, 1 (4) 511-516 (2011).
Eyer, J. et al., Energy Storage for the Electricity Grid: Benefits and Market Potential Assessment Guide, A Study for the DOE Energy Storage Systems Program, Sandia National Laboratories (2010).
Hu, Bo et al., A Long Cycling Aqueous Organic Redox Flow Battery (AORFB) Towards Sustainable and Safe Energy Storage, Journal of the American Chemical Society, http://pubs.acs.org. Dec. 15, 2016 (pp. 1-10).
Huskinson, Brian et al., A Metal-Free Organic-Inorganic Aqueous Flow Battery, Nature 12909, vol. 505, 195-210, (2014).
Janoschka, Tobias et al., Aqueous Redox-Flow Battery With High Capacity and Power: The TEMPTMA/MV System, Angew. Communications Int. Ed 55, 1-5 (2016).
Kim J.H. et al., Development of Metal-Based Electrodes for Non-aqueous Redox Flow Batteries, Electrochemistry Communication, 13 (9) 997-1000 (2011).
Lee, J.-Y et al., Low Band-Gap Polymers Based on Quinoxaline Derivatives and Fused Thiophene as Donor Materials for High Efficiency Bulk-Heterojunction Photovoltaic Cells, Journal of Materials Chemistry 19 (28), 4938-4945 (2009).
Li, Zhen et al., Electrochemical Properties of an All-Organic Redox Flow Battery Using 2,2,6,6-Tetramethyl-1-Piperidinyloxy and N-Methylphthalimide, Electrochemical and Solid State Letters 14 (12), A171-A173 (2011).
Lin, Kaixiang et al., A Redox-Flow Battery With an Alloxazine-Based Organic Electrolyte, Nature Energy 10.1038, vol. 1, 1-8 (2016).
Lin, Kaixiang et al., Alkaline Quinone Flow Battery, Science, vol. 349 (6255), 1529-1532 (2015).
Matsunaga T. et al., High-Performance Lithium Secondary Batteries Using Cathode Active Materials of Triquinoxalinylenes Exhibiting Six Electron Migration; Chemistry Letters 40 (7), 750-752 (2011).
Moshurchak, L.M. et al., High-Potential Redox Shuttle for Use in Lithium-Ion Batteries, Journal of the Electrochemical Society, 156 (4) A309-A312 (2009).
Pan, Feng et al., Redox Species of Redox Flow Batteries: A Review, Molecules 20, 20499-20517 (2015).
Ponce De Leon, C. et al., Redox Flow Cells for Energy Conversion, Journal of Power Sources, 160 (1), 716-732 (2006).
Sevov, Christo S. et al., Cyclopropenium Salts as Cyclable, High-Potential Catholytes in Nonaqueous Media, Advanced Energy Materials 1602027, 1-5 (2016).
Skyllas-Kazacos M. et al., Progress in Flow Battery Research and Development, Journal of the Electrochemical Society, 158 (8), R55-R79 (2011).
Tormena, C.F. et al., Revisiting the Stability of Endolexo Diels-Alder Adducts Between Cyclopentadiene and 1,4-Benzoquinone, Journal Brazil Chemical Society 21 (1), pp. 112-118 (2010).
Weber, A.Z. et al., Redox Flow Batteries: A Review, Journal of Applied Electrochemistry, 41 (10) 1137-1164 (2011).
Wen, J. et al., A Review on Lithium-Ion Batteries Safety Issues: Existing Problems and Possible Solutions, Materials Express 2, (3), pp. 197-212 (2012).
Winsberg, J. et al., Redox-Flow Batteries: From Metals to Organic Redox-Active Materials, Angew. Chem. Int. Ed. 56, 686-711 (2017).
Yang, Z. et al., Electrochemical Energy Storage for Greed Grid. Chemical Reviews, 111 (5), 3577-3613 (2011).
Yamamura, T. et al., Electrochemical Investigation of Uranium β-diketonates for All-Uranium Redox Flow Battery, Electrochimica Acta 48, 43-50 (2002).
Yates, P. et al., The 1:1 and 2:1 Adducts of Cyclopentadiene with p-Benzoquinone, Can. J. Chemical 68, pp. 1984-1900 (1990).
Zhang, L. et al., Redox Shuttle Additives for Lithium-Ion Battery, Lithium Ion Batteries—New Developments 7, 173-189 (2012).
Zhang, L. et al., Molecular Engineering Towards Safer Lithium-Ion Batteries: A Highly Stable and Compatible Redox Shuttle for Overcharge Protection, Energy & Environmental Science 5, 8204-8207 (2012).
Zhang, L. et al., Redox Shuttles for Overcharge Protection of Lithium-Ion Batteries, ECS Transactions 45 (29), 57-66 (2013).

* cited by examiner

AQUEOUS REDOX FLOW BATTERIES

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to redox flow batteries. More particularly, this invention relates to aqueous redox flow batteries.

BACKGROUND OF THE INVENTION

Low-cost, scalable energy storage systems are needed to improve the energy efficiency of the electrical grid (e.g., load-leveling, frequency regulation) and to facilitate the large-scale penetration of renewable energy resources (e.g., wind, solar). While alternative energy technologies exist, they cannot be directly connected to the grid because of their variable output. Electrochemical energy storage may provide the best combination of efficiency, cost, and flexibility to enable these applications. Of particular interest are redox flow batteries, which are rechargeable electrochemical energy storage devices that utilize the oxidation and reduction of two soluble electroactive species for charging (absorbing energy) and discharging (delivering energy). Unlike conventional secondary batteries, the energy-bearing species are not stored within an electrode structure but in separate liquid reservoirs and pumped to and from the power converting device when energy is being transferred. Because of this key difference, flow battery systems can be more durable than conventional battery systems as electrode reactions are not accompanied by morphological changes due to the insertion or removal of the active species and can be more scalable than conventional battery systems as the energy capacity may be easily and inexpensively modulated by varying the reservoir volume or the species concentration, without sacrificing power density. Thus, while flow batteries may not compete with compact lithium (Li)-ion batteries for portable applications (e.g., cell phones, laptops) due to lower overall energy densities, they are well-suited for large-scale stationary applications.

Since their inception in the 1960s, a large number of aqueous redox flow batteries have been developed including iron-chromium, bromine-polysulfide, vanadium-bromine, and all-vanadium systems. Several aqueous hybrid systems also have been developed, where one or both electrode reactions are a deposition/dissolution process, such as zinc-bromine and soluble lead-acid systems. Organic redox materials also have been utilized, however, organic materials often suffer from stability issues (e.g., due to side reactions), low solubility, and the like. In the case of catholytes, oxidation potentials are often low (e.g., <0.8 V versus SHE).

All current aqueous flow battery designs have functional or cost-performance limitations that hamper large scale adoption of this technology. Thus, there is an ongoing need for new redox flow batteries. The present invention addresses this need.

SUMMARY OF THE INVENTION

The present invention provides an aqueous redox flow battery comprising a negative electrode ("anode"), which functions as a current collector, immersed in a first aqueous electrolyte (also referred to herein as a "negative electrolyte" or "anolyte"), a positive electrode (cathode), which also functions as a current collector, immersed in a second aqueous electrolyte (also referred to herein as a "positive electrolyte" or "catholyte"), and a cation-permeable separator (e.g., a membrane or other cation-permeable material) partitioning the negative electrode/anolyte from the positive electrode/catholyte. During charging and discharging, the electrolytes are circulated over their respective electrodes, while cations from the electrolytes shuttle through the membrane and between the two electrolytes to balance the charges that develop as a result of oxidation and reduction of redox reactant components in the electrolytes.

Each of the anolyte and the catholyte comprises an acid-soluble redox reactant. The redox reactant of the catholyte is selected to have a higher redox potential than the redox reactant of the anolyte.

The catholyte comprises a redox reactant which is a compound of Formula (I):

$A\text{-}(CHR^1)_n\text{-}X$; wherein: (I)

A is an organic moiety selected from the group consisting of Formula (II), Formula (III), Formula (IV), Formula (V), Formula (VI), Formula (VII), and Formula (VIII):

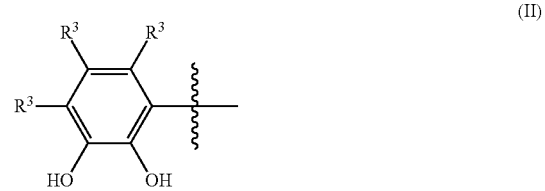

(II)

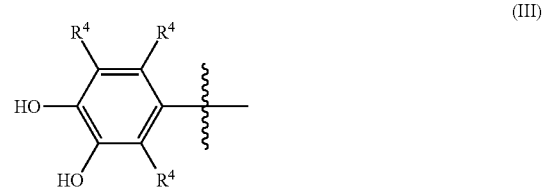

(III)

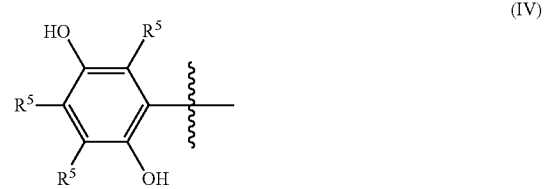

(IV)

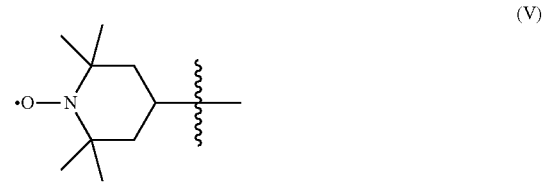

(V)

(VI)

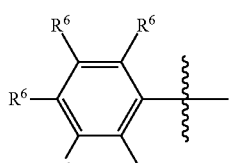
(VII)

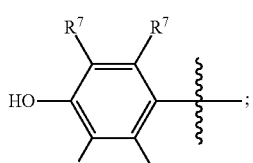
(VIII)

X is $NH_2$, $NHR^2$, or $N(R^2)_2$, or $N^+(R^2)_3\ Z^-$;

$Z^-$ is an anion;

each $R^1$, $R^3$, $R^4$, $R^5$, $R^6$, and $R^7$ independently is selected from H, F, Cl, Br, CN, $CF_3$, $C(=O)OR^8$, $C(=O)R^9$, $OR^{10}$, $SR^{11}$, $N(R^{12})_2$, $OSi(R^{13})_3$, $Si(R^{13})_3$, $PO_3H_2$, $SO_3H$, alkyl, and substituted-alkyl;

each $R^2$ independently is selected from alkyl and substituted-alkyl;

each $R^8$, $R^9$, $R^{10}$, $R^{11}$ and $R^{12}$ independently is selected from H, alkyl, and substituted-alkyl;

each $R^{13}$ independently is alkyl;

n is 0, 1, 2, or 3;

each substituted-alkyl independently is an alkyl group substituted by one or more of F, Cl, Br, CN, $CF_3$, a carboxylic acid group, an aldehyde group, ketone group, an alkoxy group, a thiol group, an alkylthio group, a primary amino group, a secondary amino group, a tertiary amino group, a trialkylsilyl group, a trialkylsilyloxy group, $PO_3H_2$, or $SO_3H$;

when n is 0, A is an organic moiety selected from the group consisting of Formula (II), Formula (III), Formula (IV), Formula (V), Formula (VI), Formula (VII), and Formula (VIII); and when n is 1, 2, or 3, A is an organic moiety selected from the group consisting of Formula (II), Formula (III), Formula (IV), Formula (V), and Formula (VI).

The cation-permeable separator membrane is adapted to allow cations to cross the membrane and balance out charges in the anolyte and catholyte that develop during the charging and discharging of the battery.

Optionally, the catholyte may comprise another acid-soluble redox reactant in additional to the compound of Formula (I). Such other redox materials are well known in the flow battery art. Non-limiting examples of such other redox materials include, e.g., acid-soluble hydroquinone compounds, acid-soluble N-oxyl radial compounds, and the like, which lack an amino substituent, e.g., such as certain compounds discussed by Winsberg et al., *Angewandte Chemie Int. Ed.*; 2017, 56:686-711, which is incorporated herein by reference in its entirety.

The redox material of the anolyte can be any acid-soluble redox material with a lower redox potential than the catholyte redox material. Anolyte materials suitable for use in aqueous, acidic redox flow batteries are well known in the art. Non-limiting examples of such anolyte materials include anthraquinone-2,7-disulfonic acid salts (AQDS), 9,10-Anthraquinone-2,6-disulfonic acid, anthraquinone-2-sulfonic acid salts (AQS), anthraflavic acid, methyl viologen, vanadium ions and other such materials, e.g., including materials disclosed by Winsberg et al., referred to above.

The following non-limiting embodiments are described herein to illustrate certain features and aspects of the batteries described herein.

Embodiment 1 is an aqueous redox flow battery comprising (a) an anode within an anolyte chamber; (b) a cathode within a catholyte chamber; (c) an anolyte comprising an acidic solution of a first acid-soluble redox reactant; (b) a catholyte comprising an acidic solution of a second acid-soluble redox reactant; (e) an ion-permeable separator membrane forming at least a portion of a common wall between the anolyte chamber and the catholyte chamber; wherein the anolyte contacts the anode and the separator membrane when circulated through the anolyte chamber; the catholyte contacts the cathode and the separator membrane when circulated through the catholyte chamber; during charging and discharging the anolyte and catholyte are circulated over the anode and cathode, respectively, while cations from the anolyte and catholyte shuttle through the separator membrane to balance the charges that develop as a result of oxidation and reduction of the first and second acid-soluble redox reactants; the first acid-soluble redox reactant has a lower redox potential than the second acid-soluble redox reactant; and wherein the second acid-soluble redox reactant comprises a compound of Formula (I) as described herein.

Embodiment 2 is the aqueous redox flow battery of Embodiment 1, wherein the first acid-soluble redox reactant is present in the anolyte at a concentration in the range of about 0.001 molar (M) to about 5 M Embodiment 3 is the aqueous redox flow battery of Embodiment 1 or 2, wherein the second acid-soluble redox reactant is present in the catholyte at a concentration in the range of about 0.001 M to about 5 M.

Embodiment 4 is the aqueous redox flow battery of any one of Embodiments 1 to 3, wherein the first acid-soluble redox reactant is dissolved in an aqueous acid selected from the group consisting of sulfuric acid, phosphoric acid, hydrochloric acid, citric acid, acetic acid, and a combination of two or more thereof.

Embodiment 5 is the aqueous redox flow battery of any one of Embodiments 1 to 4, wherein the second acid-soluble redox reactant is dissolved in an aqueous acid selected from the group consisting of sulfuric acid, phosphoric acid, hydrochloric acid, citric acid, acetic acid, and a combination of two or more thereof.

Embodiment 6 is the aqueous redox flow battery of any one of Embodiments 1 to 5, wherein the organic moiety, A, is selected from Formula (II), Formula (III), and Formula (IV).

Embodiment 7 is the aqueous redox flow battery of Embodiment 6, wherein at least one $R^3$, $R^4$, or $R^5$ is H.

Embodiment 8 is the aqueous redox flow battery of Embodiment 6 or 7, wherein at least one $R^3$, $R^4$, or $R^5$ is $SO_3H$.

Embodiment 9 is the aqueous redox flow battery of any one of Embodiments 6 to 8, wherein n is 1, 2, or 3.

Embodiment 10 is the aqueous redox flow battery of any one of Embodiments 6 to 9, wherein the compound of Formula (I) is selected from adrenaline, 3,4-dihydroxyphenylalanine (DOPA), and dopamine.

Embodiment 11 is the aqueous redox flow battery of any one of Embodiments 1 to 5, wherein the organic moiety, A, is selected from Formula (V) and Formula (VI).

Embodiment 12 is the aqueous redox flow battery of Embodiment 11, wherein at least one $R^1$ is H.

Embodiment 13 is the aqueous redox flow battery of Embodiment 11 or 12, wherein at least one $R^2$ is H.

Embodiment 14 is the aqueous redox flow battery of any one of Embodiments 11 to 13, wherein at least one $R^2$ is selected from alkyl and substituted alkyl.

Embodiment 15 is the aqueous redox flow battery of any one of Embodiments 11 to 14, wherein n is 1.

Embodiment 16 is the aqueous redox flow battery of any one of Embodiments 11 to 14, wherein n is 0.

Embodiment 17 is the aqueous redox flow battery of any one of Embodiments 1 to 16, wherein the compound of Formula (I) is selected from 4-amino-2,2,6,6-tetramethylpiperidyl-1-oxyl (also referred to as 4-amino-TEMPO or 4-$NH_2$-TEMPO) and 3-aminomethyl-2,2,5,5-tetramethyl-1-pyrrolidine-1-oxyl (also referred to as 3-aminomethyl-PROXYL).

Embodiment 18 is the aqueous redox flow battery of any one of Embodiments 1 to 5, wherein the organic moiety, A, is selected from Formula (VII) and Formula (VIII).

Embodiment 19 is the aqueous redox flow battery of Embodiment 18, wherein at least one $R^2$ is selected from alkyl and substituted alkyl.

Embodiment 20 is the aqueous redox flow battery of Embodiment 18 or 19, wherein at least one $R^6$ or $R^7$ is $SO_3H$.

Embodiment 21 is the aqueous redox flow battery of any one of Embodiments 11 to 20, wherein the compound of Formula (I) is selected from 1-dimethylamino-4-hydroxybenzene and 1-dimethylamino-4-hydroxy-benzene-3,5-disulfonic acid.

The redox materials described herein typically provide enhanced water solubility for organic redox materials by including an amino group, and provide improved cycling stability relative to similar non-aminated materials utilizing solubilizing groups such as hydroxyl and sulfonic acid groups.

Figure 17:
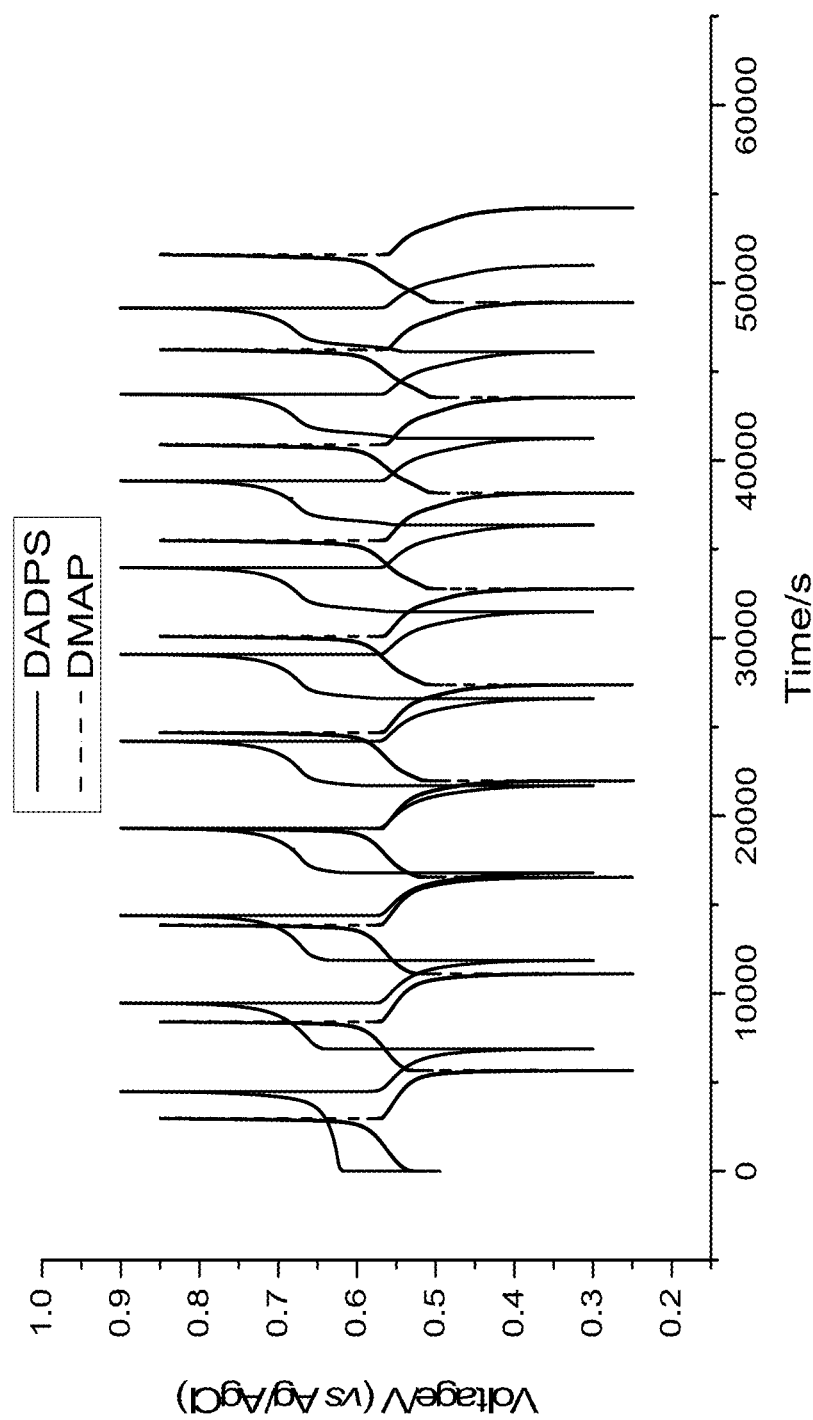
FIG. 17 shows voltage profiles for the bulk electrolysis of 1 mM DMAP (dashed line) and 1 mM DADPS (solid line) in 3.0 M sulfuric acid using constant current of 2.68 mA with a cut-off voltage from 0.25 V to 0.85 V versus Ag/AgCl reference electrode.
Figure 18:
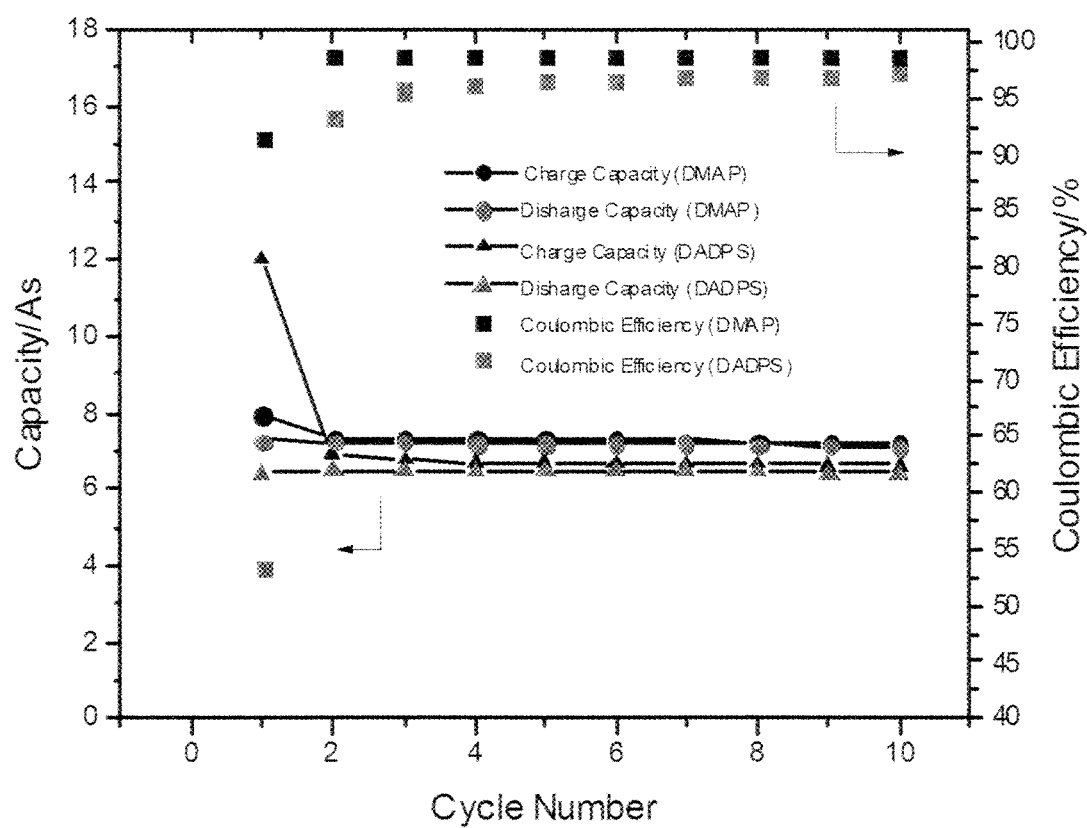
FIG. 18 shows bulk electrolysis cycling performance data for DMAP and DADPS showing plats of capacity vs. cycle number (left axis) and coulombic efficiency (right axis).

The bulk electrolysis data in FIG. 17 and FIG. 18 demonstrate that the potential of the flow cell can be increased by introducing electron-withdrawing groups (sulfonate group; DADPS), whereas the capacity and capacity retention are very similar for both DMAP and DADPS.

DETAILED DESCRIPTION OF THE PREFERRED EMBODIMENTS

The present invention provides aqueous redox flow batteries. In some preferred embodiments, the flow battery comprises, consists essentially of, or consists of a negative electrode immersed in an anolyte, a positive electrode immersed in a catholyte, and a cation-permeable separator to allow cations to shuttle between the anolyte and the catholyte during charging and discharging. The negative electrode and positive electrode each act as current collectors.

Each of the catholyte and the anolyte comprises, consists essentially of, or consists of an acidic solution of an acid-soluble redox reactant in an aqueous solvent. The redox reactant of the catholyte is selected to have a higher redox potential than the redox reactant of the anolyte. Cations from the anolyte and catholyte shuttle through the cation-permeable separator membrane to balance charges that develop during the oxidation and reduction of the redox reactants.

During charging of the battery, an electric potential is applied to the negative and positive electrodes, while simultaneously pumping the anolyte over the negative electrode, and pumping the catholyte over the positive electrode. Cations flow across the cation-permeable separator to balance the charges. During charging, the redox reactant of the anolyte is reduced, while the redox reactant of the catholyte is oxidized, thus building up the concentration of the resulting reduced and oxidized reactants in the respective anolyte and catholyte storage tanks. In this way, energy can be stored by charging the battery from an energy source during off-peak usage periods.

During discharge, the electrodes are placed in a circuit (e.g., with a power grid) and the direction of electrolyte flow is reversed, with the stored reduced anolyte being pumped over the negative electrode, and the stored oxidized positive redox reactant being pumped over the positive electrode, thus resulting in the reversal of the redox reactions and release of the stored energy. Cations again flow across the cation-permeable separator (in the opposite direction) to balance the charges. The energy stored in the system can thus be directly used to perform work or can be transferred back into the power grid during peak usage periods to supplement the power supply. An AC/DC converter can be used to facilitate transfer of energy to and from an AC power grid.

The catholyte of the redox flow batteries described herein comprises a redox reactant of Formula (I) dissolved in an acid: (I) A-(CHR$^1$)$_n$—X. In Formula (I), the redox active portion of the compound is the group "A", which is an organic moiety selected from the group consisting of Formula (II), Formula (III), Formula (IV), Formula (V), Formula (VI), Formula (VII), and Formula (VIII):

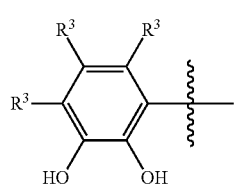

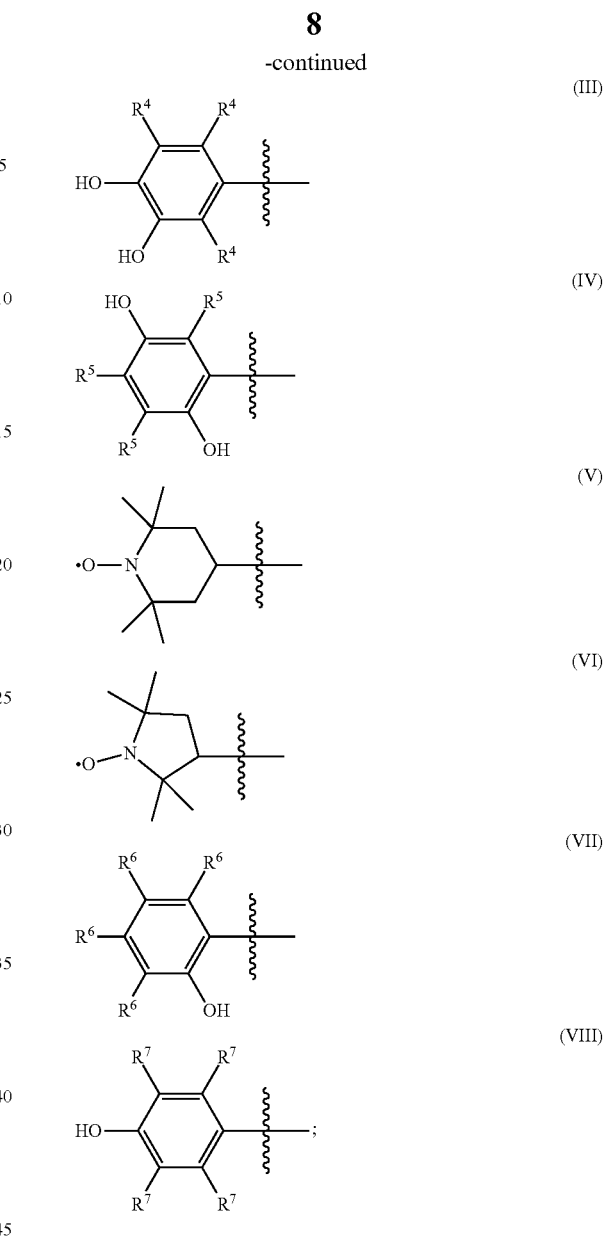

and X is an amino group that provides water solubility to the redox reactant, and which can be a primary, secondary, tertiary, or quaternary amino group, i.e., NH$_2$, NHR$^2$, or N(R$^2$)$_2$, or N$^+$(R$^2$)$_3$Z, where Z is an anion, and each R$^2$ independently is selected from alkyl and substituted-alkyl. In some embodiments, X is a primary amino group (NH$_2$). In some other embodiments each R$^2$ independently is C$_1$ to C$_4$ alkyl (e.g., methyl, ethyl isopropyl t-butyl, and the like).

Each R$^1$, R$^3$, R$^4$, R$^5$, R$^6$, and R$^7$ in Formula (I) independently is selected from H, F, Cl, Br, CN, CF$_3$, C(=O)OR$^8$, C(=O)R$^9$, OR$^{10}$, SR$^{11}$, N(R$^{12}$)$_2$, OSi(R$^{13}$)$_3$, Si(R$^{13}$)$_3$, PO$_3$H$_2$, SO$_3$H, alkyl, and substituted-alkyl; and each R$^8$, R$^9$, R$^{10}$, R$^{11}$ and R$^{12}$ independently is selected from H, alkyl, and substituted-alkyl, while each R$^{13}$ independently is alkyl (e.g., C$_1$ to C$_4$ alkyl, such as methyl ethyl, isopropyl, t-butyl and the like). In some embodiments, each R$^1$, R$^3$, R$^4$, R$^5$, R$^8$, R$^9$, R$^{10}$, R$^{11}$, and R$^{12}$ independently is H or C$_1$ to C$_4$ alkyl (e.g., methyl ethyl, isopropyl, t-butyl and the like). In some embodiments, each R$^6$ and R$^7$ is H, C$_1$ to C$_4$ alkyl (e.g., methyl ethyl, isopropyl, t-butyl and the like), or a sulfonic acid group. The number of repeating CHR$^1$ units in Formula (I), represented by "n" can be 0, 1, 2, or 3.

As used herein, the term "substituted-alkyl" refers to alkyl groups (e.g., $C_1$ to $C_4$ alkyl) that are substituted by one or more of F, Cl, Br, CN, $CF_3$, a carboxylic acid group, an aldehyde group, ketone group, an alkoxy group, a thiol group, an alkylthio group, a primary amino group, a secondary amino group, a tertiary amino group, a trialkylsilyl group, a trialkylsilyloxy group, $PO_3H_2$, or $SO_3H$.

When n in Formula (I) is 0, A is an organic moiety selected from the group consisting of Formula (II), Formula (III), Formula (IV), Formula (V), Formula (VI), Formula (VII), and Formula (VIII); and when n is 1, 2, or 3, A is an organic moiety selected from the group consisting of Formula (II), Formula (III), Formula (IV), Formula (V), and Formula (VI).

Amino-substituted hydroquinone compounds, such as compounds of Formula (I) where A is a group of Formula (II), (III), or (IV), can be prepared using conventional methods for introducing amino groups into organic compounds such as catechols or hydroquinones, which are well known in the chemical arts. As used herein, the term "hydroquinone" refers to both 1,4-dihydoxybenzene compounds and 1,2-dihydroxybenzene compounds (also known as catechols). Some amino-substituted hydroquinone compounds, such as dopamine (3,4-dihydroxyphenethylamine, L-adrenaline (4-[(1R)-1-hydroxy-2-(methylamino)ethyl]-1,2,benzenediol), and L-dopa (L-3,4-dihydroxyphenylalanine) are well known compounds, which are commercially available.

Amino-substituted stable N-oxyl radical compounds, such as compounds of Formula (I) where A is a group of Formula (V), i.e., a 4-substituted 2,2,6,6-tetramethylpiperidin-1-oxyl (TEMPO) radical, or where A is a group of Formula (VI), i.e., a 4-substituted 2,2,6,6-tetramethylpyrrolidin-1-oxyl (PROXYL) radical, can be synthesized by conventional methods for preparing N-oxyl radicals and for introducing amino groups onto saturated heterocyclic compounds. For example, the N-oxyl radical group (NO.) can be introduced by oxidation of the corresponding amine (—NH—), and the Z amino group can be introduced e.g., by displacement of a leaving group (e.g., a halogen) or by reduction of a nitro group, for example. Some amino substituted TEMPO and PROXYL compounds have been previously reported in the chemical literature, and in some cases are commercially available, e.g., 4-amino-TEMPO (Compound (I) where n is 0, Z is $NH_2$, and A is a moiety of Formula (VII)); and 3-aminomethyl-PROXYL (Compound (I) where n is 1, $R^2$ is H, Z is $NH_2$, and A is a moiety of Formula (VIII)).

Similarly, amino-substituted phenol compounds such as compounds of Formula (I) where A is a group of Formula (VII) or (VIII) can be prepared using conventional, well-known methods for introducing amino groups onto phenol compounds (e.g., by reduction of nitro or azido groups, and the like). Some amino phenols are well known in the art, such as 4-dimethylaminophenol.

The redox reactants can be present in the catholyte and anolyte at concentrations in the range of about 0.001 M to about 5 M. In some embodiments, the redox reactants are present in the catholyte and anolyte at concentrations in the range of about 0.1 M to 5 M, or 0.25 M to 5M. The acid components of the catholyte and anolyte can be any acid with an oxidation potential greater than that of water, e.g., sulfuric acid, phosphoric acid, hydrochloric acid, citric acid, acetic acid, and the like. Additionally, the anolyte and/or catholyte can include additional materials, such as salts (e.g., alkali metal sulfates, chlorides, and/or phosphates; alkaline earth metal sulfates, chlorides, and/or phosphates; and zinc sulfate, chloride, and/or phosphate).

Figure 1:
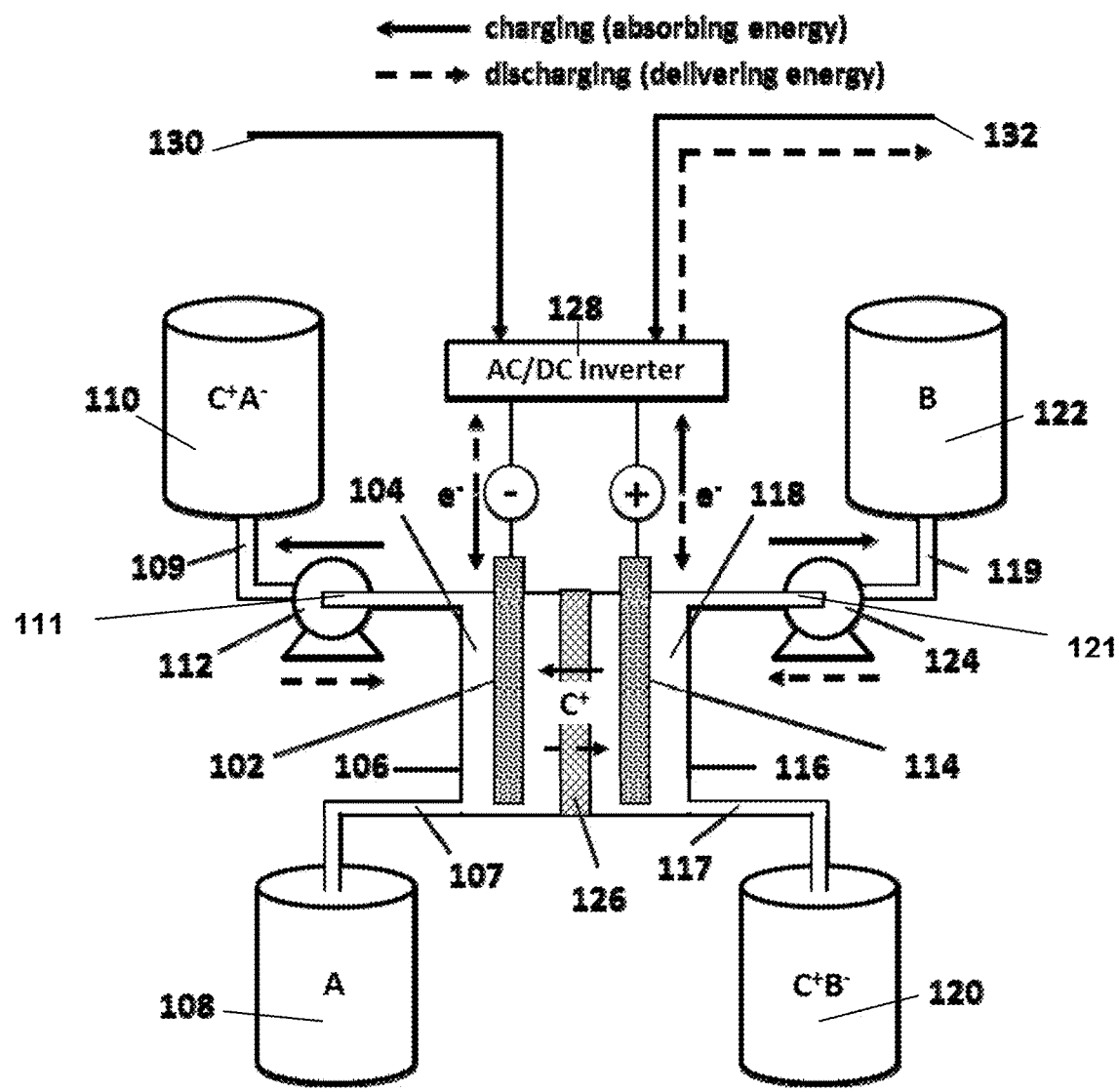
FIG. 1 provides a schematic illustration of one exemplary redox flow battery suitable for large-scale electrochemical energy storage.

FIG. 1 schematically illustrates an aqueous redox flow battery design. The redox flow battery comprises negative electrode 102 within negative electrolyte chamber (anolyte chamber) 104, defined by housing 106. First negative electrolyte reservoir (anolyte reservoir) 108 is in fluid-flow communication with anolyte chamber 104 via pipe 107. Second anolyte reservoir 110 is operably connected to pump 112 via pipe 109, while pump 112 also is operably connected to anolyte chamber 104 via pipe 111. Pump 112 is adapted to facilitate transfer of negative electrolyte (anolyte) back and forth between first anolyte reservoir 108 to second anolyte reservoir 110 through anolyte chamber 104, such that the flowing electrolyte contacts negative electrode 102. The battery also includes a positive electrode 114 within positive electrolyte chamber (catholyte chamber) 118, defined by housing 116. First positive electrolyte reservoir (catholyte reservoir) 120 is in fluid-flow communication with catholyte chamber 118 via pipe 117. Second catholyte reservoir 122 is operably connected to pump 124 via pipe 119, while pump 124 also is operably connected to catholyte chamber 118 via pipe 121. Pump 124 is adapted to facilitate transfer of positive electrolyte (catholyte) back and forth between first catholyte reservoir 120 to second catholyte reservoir 122 through catholyte chamber 118, such that the flowing electrolyte contacts positive electrode 114. Cation-permeable separator 126 separates anolyte chamber 104 from catholyte chamber 118, and allows passage of cations ($C^+$) back and forth between the positive and negative electrolytes to balance out charges that form during oxidation and reduction of materials within the electrolytes.

During charging of the redox flow battery, an electric potential is applied to the negative electrode 102 and positive electrode 114, e.g., from an energy source 130 via AC/DC converter 128, while simultaneously pumping the negative electrolyte over negative electrode 102 from first anolyte reservoir 108 to second anolyte reservoir 110, and simultaneously pumping the positive electrolyte over the positive electrode from the first catholyte reservoir 120 to the second catholyte reservoir 122. Cations ($C^+$) pass through cation-permeable separator 126 to balance the charges. A negative redox reactant material (represented by $A/A^-C^+$) and a positive redox reactant material (represented by $B/B^-C^+$) in the electrolytes undergo redox reactions upon contact with the electrodes such that the reduced form of A is stored in second anolyte reservoir 110, while the oxidized form of B is stored in the second catholyte reservoir 122. In this way, energy can be stored by charging the battery from energy source 130 during off-peak usage periods.

During discharge, the electrodes are placed in a circuit (e.g., with a power grid 132) and the direction of electrolyte flow is reversed, with the stored reduced negative electrolyte being pumped over negative electrode 102 back into first anolyte reservoir 108, and the stored oxidized positive electrolyte being pumped over positive electrode 114 back into first catholyte reservoir 120. Cations again transfer through cation-permeable separator 126 (in the opposite direction) to balance the charges resulting from redox reactions at the electrodes. The energy stored in the system during charging can thus be directly used to perform work or can be transferred into power grid 132 during peak usage periods to supplement the power supply. AC/DC converter 128 again can be used to facilitate transfer of energy to an AC power grid.

Figure 2:
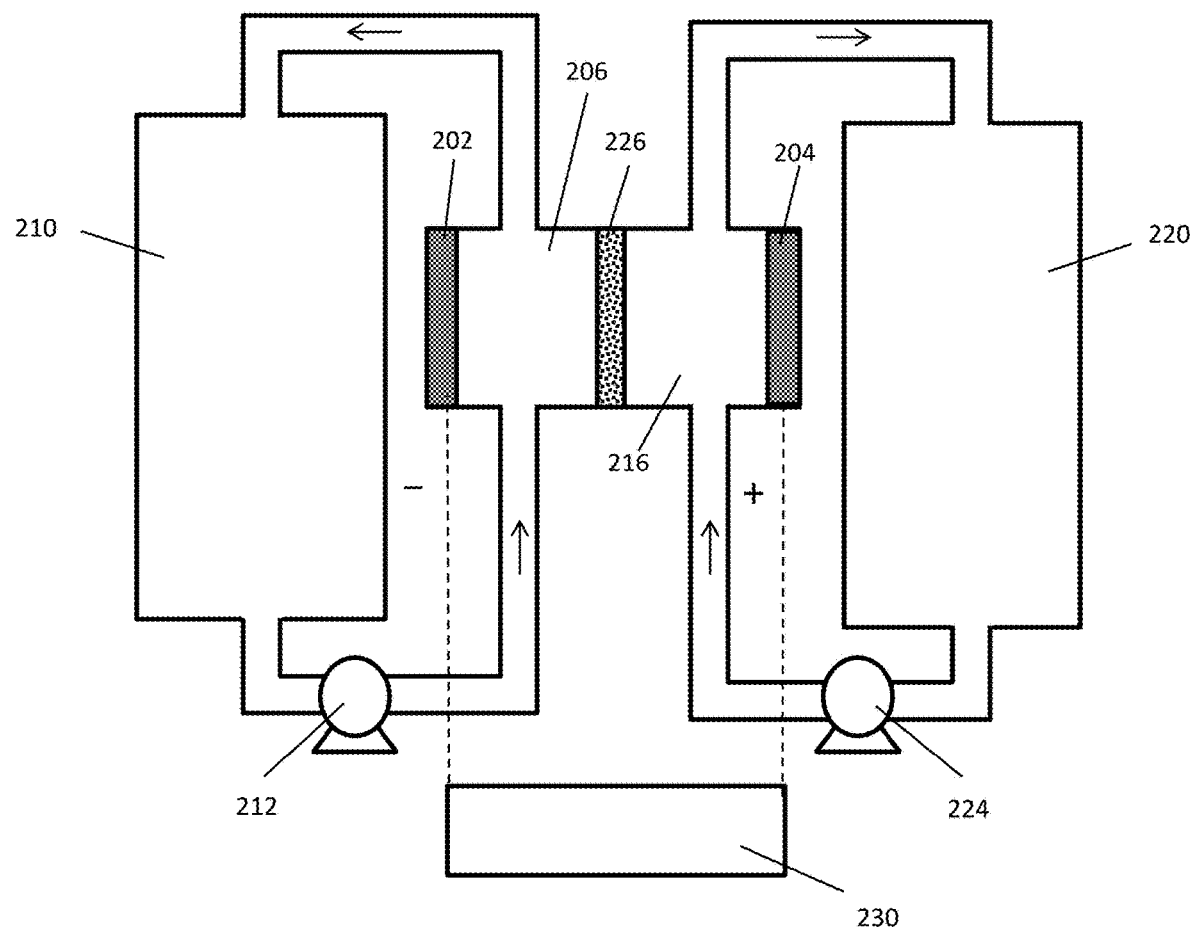
FIG. 2 provides a schematic illustration of another exemplary redox flow battery of the invention suitable for large-scale electrochemical energy storage.

FIG. 2 schematically illustrates another aqueous redox flow battery design. The redox flow battery comprises anode 202 within anolyte chamber 206. Anolyte storage tank 210 is in fluid-flow communication with anolyte chamber 206, and pump 212 is adapted to circulate anolyte through anolyte chamber 206, such that the flowing anolyte contacts anode 202. The battery also includes a cathode 204 within catholyte chamber 216. Catholyte storage tank 220 is in fluid-flow communication with catholyte chamber 216, and pump 224 is adapted to circulate catholyte through catholyte chamber 216, such that the flowing catholyte contacts cathode 204. Cation-permeable separator membrane 226 separates anolyte chamber 206 from catholyte chamber 216, and allows passage of cations (e.g., H+) back and forth between the anolyte and catholyte to balance out charges that form during oxidation and reduction of the redox materials within the anolyte and catholyte.

During charging of this redox flow battery design, an electric potential is applied to the anode 202 and cathode 204, e.g., from an energy source 230, e.g., via an AC/DC converter, while simultaneously pumping the anolyte through anolyte chamber 206 from anolyte storage tank 210, and simultaneously pumping the catholyte through catholyte chamber 216 from catholyte storage tank 220. The electrical potential across the anode and cathode causes redox reactions of the redox reactants in the anolyte (reduction) and catholyte (oxidation), while cations pass through cation-permeable separator 226 to balance the charges that develop due to the redox reactions. The anolytes and catholytes are circulated back into their respected storage tanks (206 and 216) so that the concentration of the reduced anolyte builds up in the circulating anolyte solution and the concentration of oxidized catholyte builds up in the circulating catholyte solution. In this way, energy can be stored by charging the battery from energy source 230 during off-peak usage periods.

During discharge, the electrodes 202 and 204 are placed in a circuit (e.g., with a power grid) and the reduced anolyte is pumped through the anolyte chamber 206, while the oxidized catholyte is pumped through the catholyte chamber 216. Cations again transfer through cation-permeable separator 226 (in the opposite direction) to balance the charges resulting from redox reactions at the electrodes induced by the load from the circuit. As the battery discharges, the reduced anolyte is oxidized back to its original form and the oxidized catholyte is reduced back to its original form. The energy stored in the system during charging can thus be directly used to perform work or can be transferred into the circuit (e.g., the power grid). An AC/DC converter again can be used to facilitate transfer of energy to an AC power grid. Once fully or partially discharged, the charging and discharging cycles can be repeated.

The negative and positive electrodes (anode and cathode, respectively) each can comprise, consist essentially of, or consist of a metal (e.g., platinum, copper, aluminum, nickel or stainless steel), a carbon material (e.g., carbon black, activated carbon, amorphous carbon, graphite, graphene, or a nanostructured carbon material), or a combination thereof. The electrodes can be porous, fluted, or smooth.

Pumps suitable for use in the flow batteries described herein include internal gear pumps, screw pumps, shuttle block pumps, flexible vane pumps, sliding vane pumps, circumferential piston pumps, helical twisted root pumps, piston pumps, diaphragm pumps, peristaltic pumps, centrifugal pumps, and the like, which are well known in the liquid pumping art. The utility of a given pump will be dependent on the chemical resistance of the pump to the electrolyte components in contact therewith (i.e., materials compatibility).

A cation-permeable separator membrane is situated between the anolyte chamber and the catholyte chamber and forms a common wall (or at least part of a common wall) between the two chambers. The separator is adapted to allow cations to flow back and forth between the negative and positive electrolytes upon charging and discharging of the battery. The separator can be, for example, a cation-permeable membrane, sheet, panel, or film that is permeable to the cations of the electrolytes. In some embodiments, the separator is at least partially impermeable to the redox components of the electrolytes, although this is not an absolute requirement for the batteries of the present invention.

Non-limiting examples of suitable separator materials include, NAFION® type ion exchange membranes (sulfonated tetrafluoroethylene-based fluoropolymer-copolymers), other porous polymeric materials such as, for example, sulfonated poly(ether ketones), polysulfones, polyethylene, polypropylene, ethylene-propylene copolymers, polyimides, polyvinyldifluorides, and the like, which can be in the form of membranes, matrix-supported gels, sheets, films, or panels. Other suitable materials include porous ceramics, porous insulated metals, cation-conducting glasses, and zeolites. Alternatively, the separator can be an interface between immiscible liquids. In such case, a porous film, panel, or mesh might be included to aid in maintaining separation between the liquids (e.g., as a physical support or guide to aid in maintaining laminar flow at the interface).

The following non-limiting examples are provided to illustrate certain features and aspects of the redox flow batteries described herein.

EXAMPLE 1

Methods and Materials

Cyclic voltammetry (CV) measurements: CV experiments were performed in custom-made three-electrode electrochemical cells with 3 mm diameter glassy carbon working electrode, a Ag/AgCl reference electrode and a platinum wire counter electrode using 1470E SOLARTRON ANALYTICAL INSTRUMENT.

Diffusion coefficient measurement: Diffusion coefficients were measured using Randle-Sevcik equation as shown below. In this equation, $i_p$ is the peak current, n represents the number of electrons transferred in the redox reaction, F is the Faraday's constant, A is the electrode area, c represents the concentration, v is the scan rate, D is the diffusion coefficient, R is the gas constant and T is the absolute temperature.

$$\text{Randle-Sevcik equation: } i_p = 0.4463 nFAc \sqrt{\frac{nFvD}{RT}}$$

Galvanostatic bulk electrolysis: Galvanostatic cycling test was performed with a three-electrode bulk electrolysis electrochemical cell using 1470E SOLARTRON ANALYTICAL INSTRUMENT. Reticulated vitreous carbon was used as the working electrode, Ag/AgCl electrode was used as the reference electrode and coiled platinum enclosed in glass tubes with porous ceramic frit was used as the counter electrode.

Organic Synthesis of Novel Materials:

DADPS: To 1 g of dimethylaminophenol in 3 mL dimethyl carbonate was added 3 mL fuming sulfuric acid and the reaction mixture was stirred overnight. The reaction mixture was then filtered and the filtrate was re-crystallized to obtain pure DADPS (0.8 g).

$^1$H-NMR: 7.95 (2H, s); 3.17 (6H, s). $^{13}$C-NMR: 151.9, 133.4, 131.3, 124.0, 46.8.

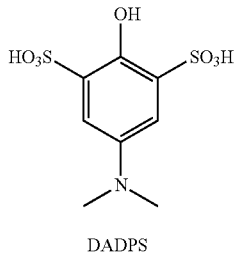

DADPS

ADPS: To 1 g of aminophenol in 3 mL dimethyl carbonate was added 3 mL fuming sulfuric acid and the reaction mixture was stirred overnight. The reaction mixture was then filtered and the filtrate was re-crystallized to obtain pure ADPS (0.8 g). $^1$H-NMR: 7.75 (2H, s). $^{13}$C-NMR: 131.0, 126.4, 123.0, 121.6.

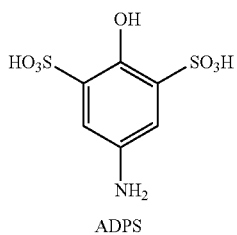 [SMILES: Nc1cc(S(=O)(=O)O)c(O)c(S(=O)(=O)O)c1 ; "ADPS"]

ADPS

EXAMPLE 2

Electrochemical Evaluation of Amino-Substituted Hydroquinones and Catechols

Amino-substituted hydroquinones and catechols (dopamine, L-adrenaline, and L-dopa) were electrochemically evaluated by cyclic voltammetry using the method described above in Example 1, in comparison to state of the art redox material TIRON. In addition, the diffusion coefficient of dopamine also was evaluated using the method described in Example 1.

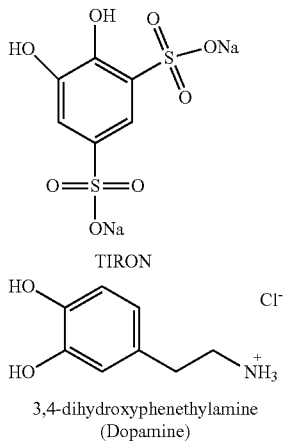

TIRON 3,4-dihydroxyphenethylamine
(Dopamine)

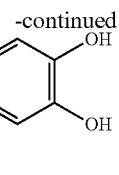

1,2-Benzenediol, 4-[(1R)-1-hydroxy-2-(methylamino)ethyl]- (L-adrenaline)

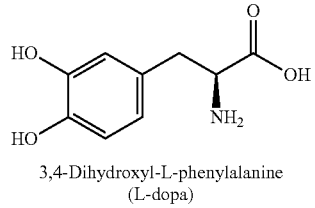

3,4-Dihydroxyl-L-phenylalanine
(L-dopa)

Figure 3:
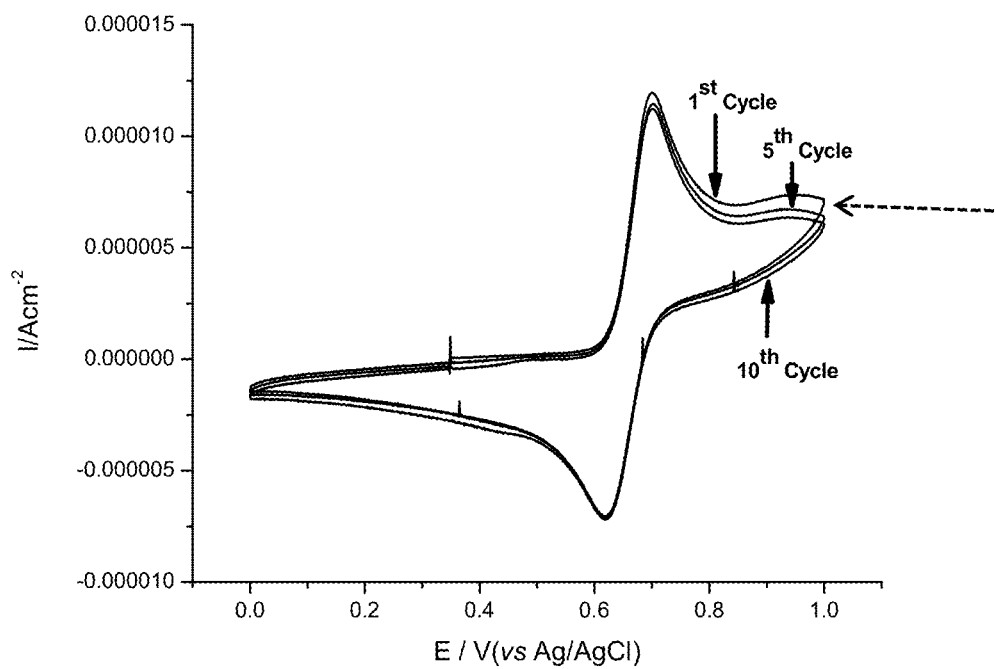
FIG. 3 shows 1st, 5th and 10th cycle cyclic voltammogram profiles for 1 mM 1,2-dihydrobenzoquinone-3,5-disulfonic acid (TIRON) in 0.5 M sulfuric acid aqueous solution using glassy carbon as working electrode. The scan rate was 20 mV/s, from 0 V to 1 V versus Ag/AgCl reference electrode.

FIG. 3 shows 1st, 5th and 10th cycle cyclic voltammogram profiles for 1 mM TIRON (1,2-dihydrobenzoquinone-3,5-disulfonic acid) in 0.5 M sulfuric acid aqueous solution using glassy carbon as working electrode. The scan rate was 20 mV/s, from 0 V to 1 V versus Ag/AgCl reference electrode. The region denoted by the dashed arrow is indicative of side reactions occurring during cycling (i.e., cycling instability), which is a known problem with TIRON under some conditions.

Figure 4:
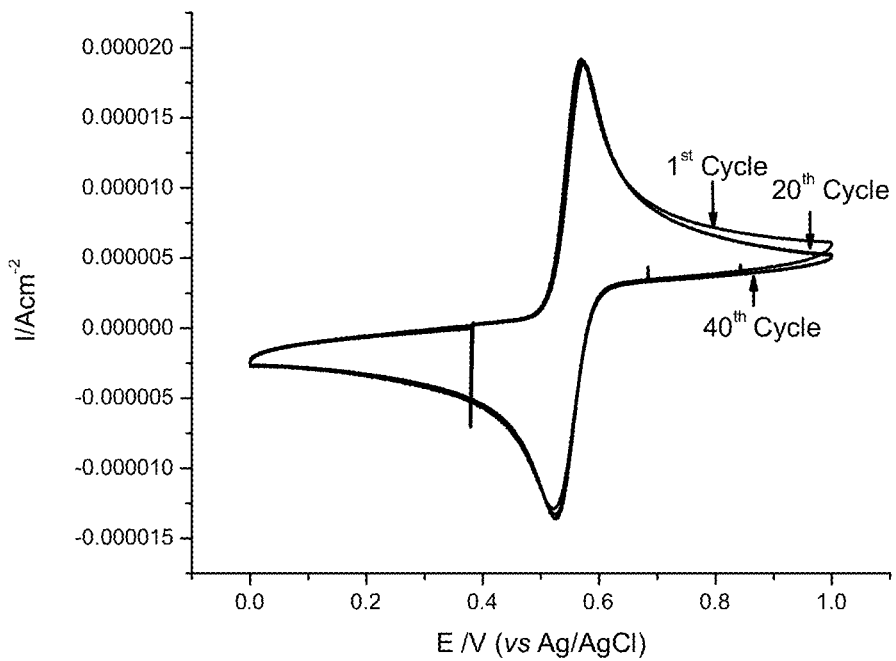
FIG. 4 shows 1st, 5th and 10th cycle cyclic voltammogram profiles for dopamine in 0.5 M sulfuric acid aqueous solution using glassy carbon as working electrode. The scan rate is 20 mV/s, from 0 V to 1 V versus Ag/AgCl reference electrode.

FIG. 4 shows 1st, 5th and 10th cycle cyclic voltammogram profiles for dopamine in 0.5 M sulfuric acid aqueous solution using glassy carbon as working electrode. The scan rate was 20 mV/s, from 0 V to 1 V versus Ag/AgCl reference electrode.

Figure 5:
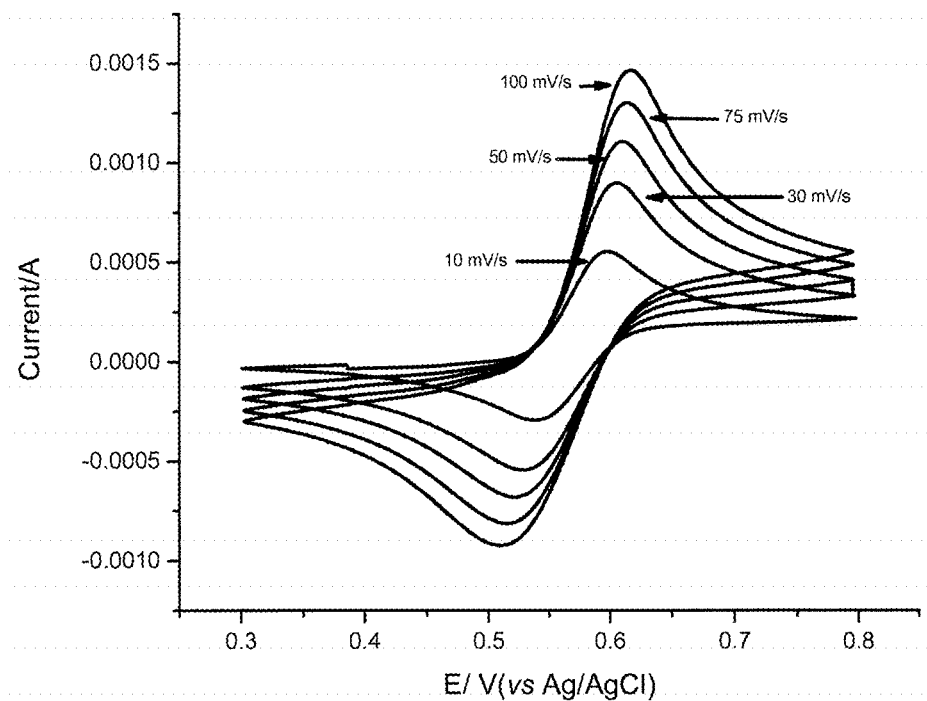
FIG. 5 shows cyclic voltammogram profiles for 50 mM dopamine dissolved in 0.5 M sulfuric acid aqueous solution measured using glassy carbon as working electrode. The scan rate was 10 mV/s, 30 mV/s, 50 mV/s, 75 mV/s and 100 mV/s from 0.3 V to 0.8 V versus Ag/AgCl reference electrode.

FIG. 5 shows cyclic voltammogram profiles for 50 mM dopamine dissolved in 0.5 M sulfuric acid aqueous solution measured using glassy carbon as working electrode. The scan rate was 10 mV/s, 30 mV/s, 50 mV/s, 75 mV/s and 100 mV/s from 0.3 V to 0.8 V versus Ag/AgCl reference electrode.

Figure 6:
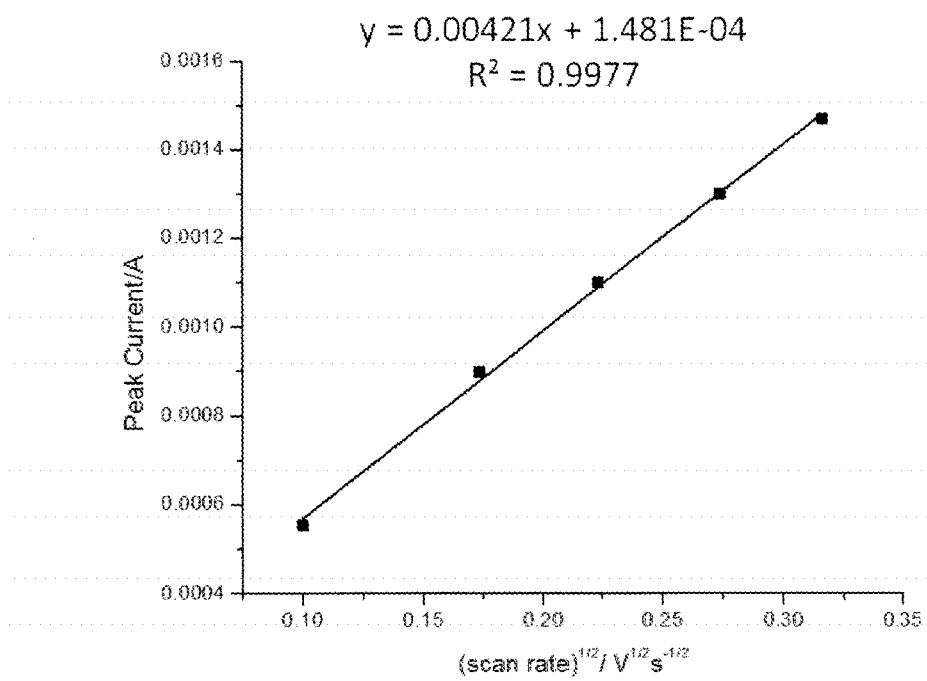
FIG. 6 shows a plot of peak current versus the square root of the scan rate for the cyclic voltammograms of 50 mM dopamine in 0.5 M sulfuric acid. Diffusion coefficient was calculated using the Randle-Sevcik equation.

FIG. 6 shows a plot of peak current versus the square root of the scan rate for the cyclic voltammograms of 50 mM dopamine in 0.5 M sulfuric acid. The diffusion coefficient was calculated to be $2.43 \times 10^{-6}$ cm$^2$/s using the Randle-Sevcik equation. The diffusion coefficient dictates how fast molecules move. In general, the larger the diffusion coefficient, the faster will be the movement of molecules and the better will be the rate performance. The diffusion coefficient of dopamine is similar to that of vanadium ion, indicating a high rate capacity as a catholyte molecule.

Figure 7:
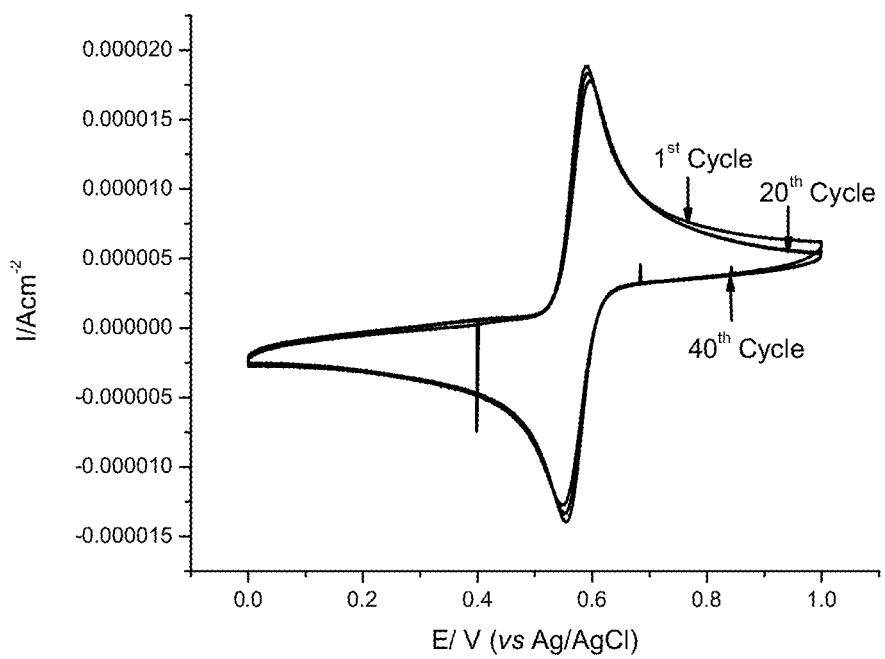
FIG. 7 shows 1st, 20th and 40th cycle cyclic voltammogram profiles for 1 mM L-adrenaline in 0.5 M sulfuric acid aqueous solution using glassy carbon as working electrode. The scan rate was 20 mV/s, from 0 V to 1 V versus Ag/AgCl reference electrode.

FIG. 7 shows 1st, 20th and 40th cycle cyclic voltammogram profiles for 1 mM L-adrenaline in 0.5 M sulfuric acid aqueous solution using glassy carbon as working electrode. The scan rate was 20 mV/s, from 0 V to 1 V versus Ag/AgCl reference electrode.

Figure 8:
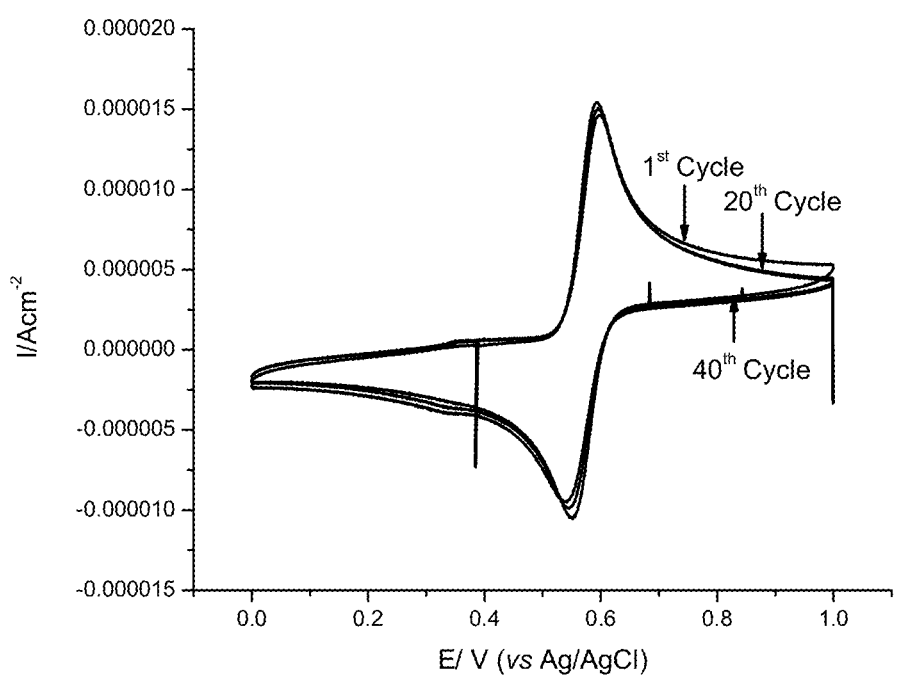
FIG. 8 shows 1st, 20th and 40th cycle cyclic voltammogram profiles for 1 mM L-dopa in 0.5 M sulfuric acid aqueous solution using glassy carbon as working electrode. The scan rate was 20 mV/s, from 0 V to 1 V versus Ag/AgCl reference electrode.

FIG. 8 shows 1st, 20th and 40th cycle cyclic voltammogram profiles for 1 mM L-dopa in 0.5 M sulfuric acid aqueous solution using glassy carbon as working electrode. The scan rate was 20 mV/s, from 0 V to 1 V versus Ag/AgCl reference electrode.

As the data in FIGS. 3-8 show, each of the amino-substituted hydroquinine and catechol compounds tested demonstrated good cycling stability and excellent solubility in aqueous acid. In addition, the amino-substituted hydroquinones and catechols exhibited improved cyclic stability relative to TIRON.

EXAMPLE 3

Electrochemical Evaluation of Amino-Substituted Oxyl-Radical Compounds

Amino-substituted N-oxyl radicals were electrochemically evaluated by cyclic voltammetry using the method described above in Example 1, in comparison to 4-hydroxy-TEMPO.

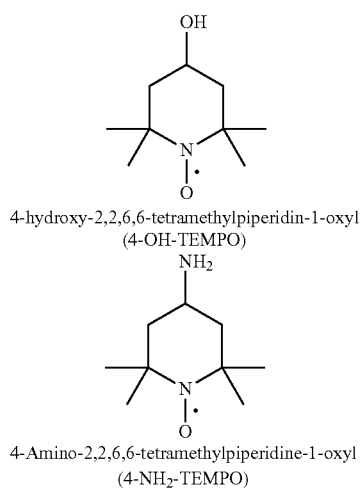

4-hydroxy-2,2,6,6-tetramethylpiperidin-1-oxyl
(4-OH-TEMPO)

4-Amino-2,2,6,6-tetramethylpiperidine-1-oxyl
(4-NH$_2$-TEMPO)

Figure 9:
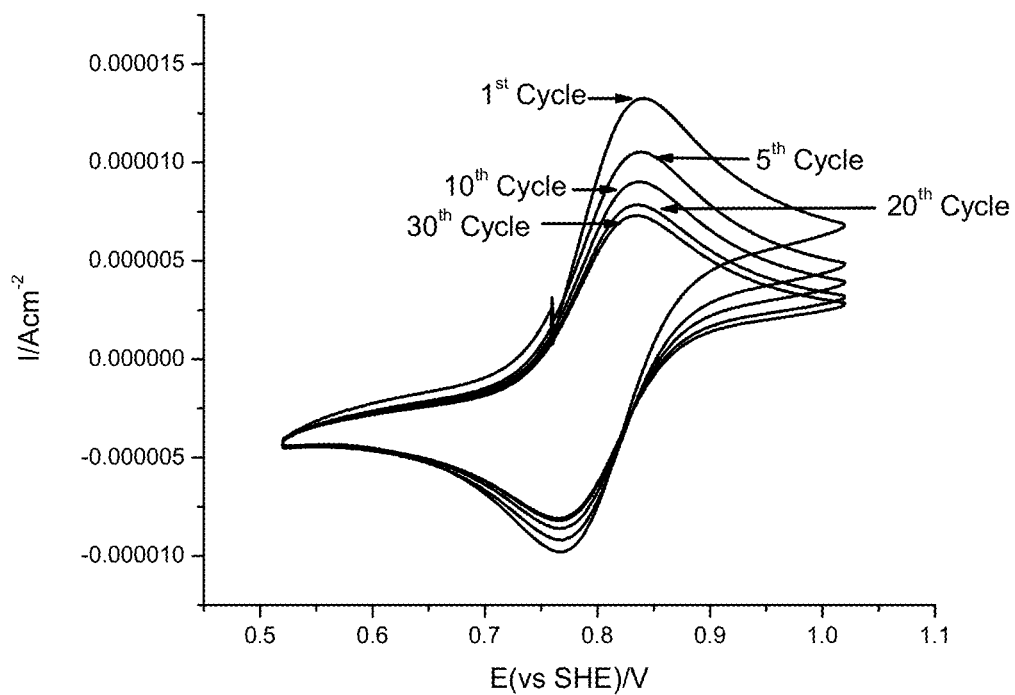
FIG. 9 shows cyclic voltammogram profiles for various cycles for 5 mM 4hydroxy-TEMPO (also referred to as 4-OH-TEMPO) in 1.0 M sulfuric acid aqueous solution using glassy carbon as working electrode. The scan rate was 5 mV/s, from 0.52 V to 0.1.02 V versus Ag/AgCl reference electrode.

FIG. 9 shows cyclic voltammogram profiles for various cycles for 5 mM 4-OH-TEMPO in 1.0 M sulfuric acid aqueous solution using glassy carbon as working electrode. The scan rate was 5 mV/s, from 0.52 V to 0.1.02 V versus Ag/AgCl reference electrode.

Figure 10:
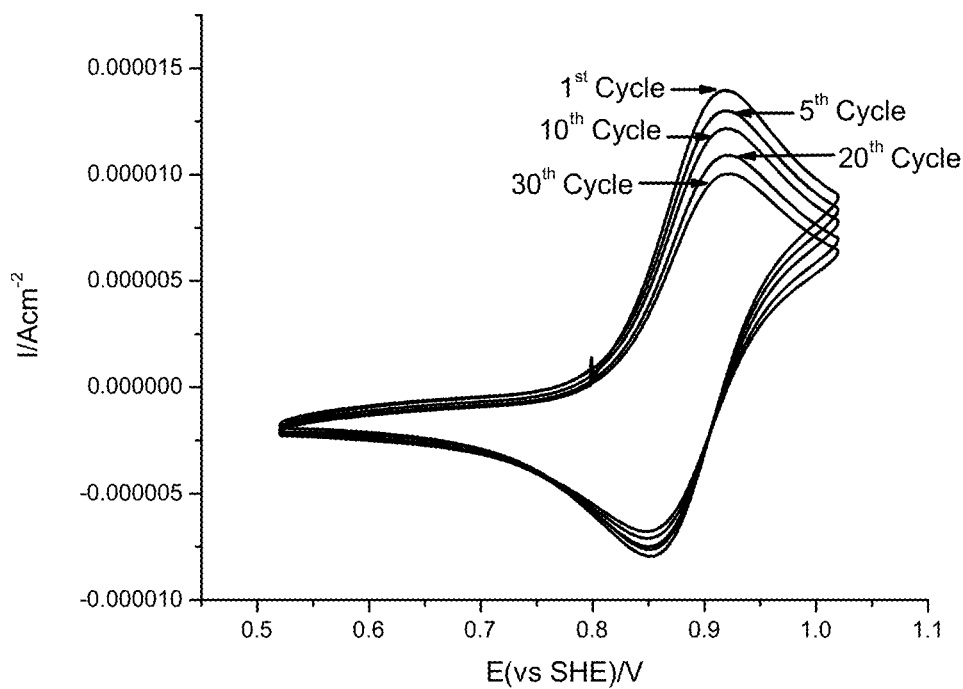
FIG. 10 cyclic voltammogram profiles for various cycles for 5 mM 4-$NH_2$-TEMPO in 1.0 M sulfuric acid aqueous solution using glassy carbon as working electrode. The scan rate was 5 mV/s, from 0.52 V to 1.02 V versus Ag/AgCl reference electrode.

FIG. 10 cyclic voltammogram profiles for various cycles for 5 mM 4-NH$_2$-TEMPO in 1.0 M sulfuric acid aqueous solution using glassy carbon as working electrode. The scan rate was 5 mV/s, from 0.0.52 V to 0.1.02 V versus Ag/AgCl reference electrode.

Figure 11:
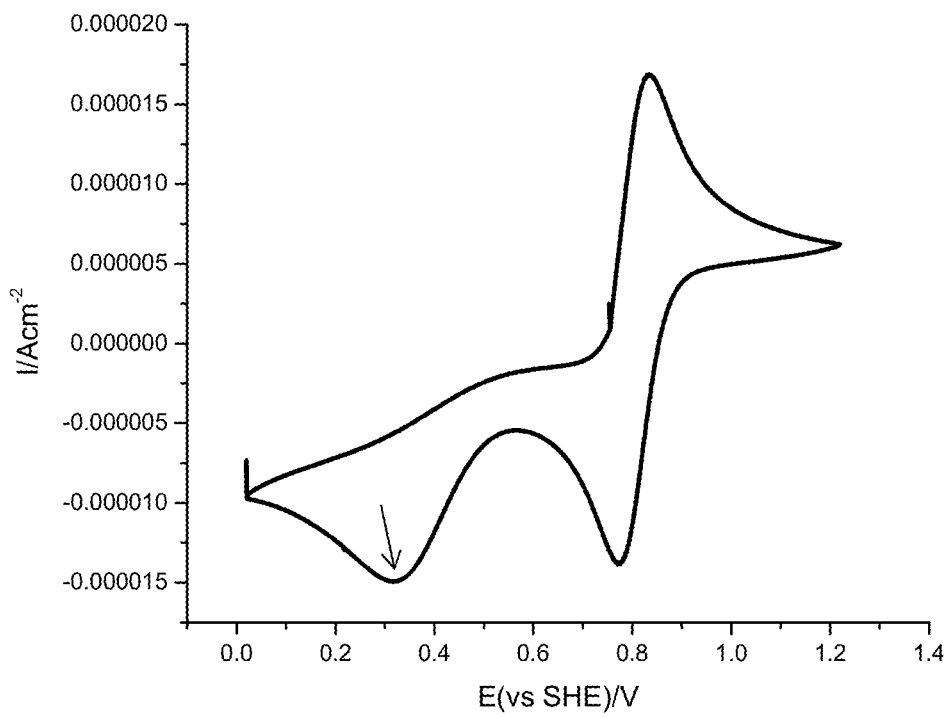
FIG. 11 shows a cyclic voltammogram for 5 mM 4-OH-TEMPO in 1.0 M sulfuric acid aqueous solution using glassy carbon as working electrode. The scan rate was 5 mV/s, from 0 V to 1.2 V versus Ag/AgCl reference electrode.

FIG. 11 shows a cyclic voltammogram for 5 mM 4-OH-TEMPO in 1.0 M sulfuric acid aqueous solution using glassy carbon as working electrode. The scan rate was 5 mV/s, from 0.0 V to 1.2 V versus Ag/AgCl reference electrode. The arrow in the cyclic voltammogram plot indicates an irreversible reduction of 4-OH-TEMPO:

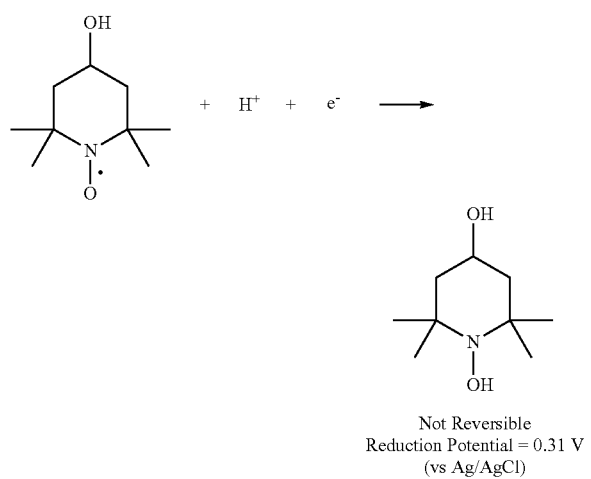

Not Reversible
Reduction Potential = 0.31 V
(vs Ag/AgCl)

Figure 12:
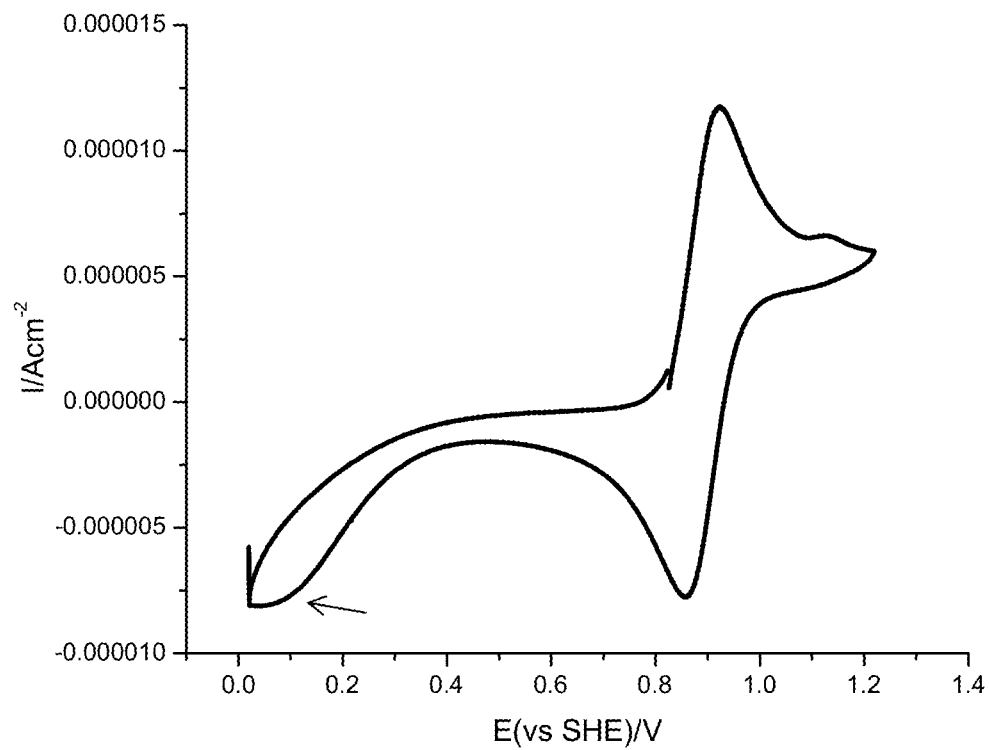
FIG. 12 shows a cyclic voltammogram for 5 mM 4-$NH_2$-TEMPO in 1.0 M sulfuric acid aqueous solution using glassy carbon as working electrode. The scan rate was 5 mV/s, from 0 V to 1.2 V versus Ag/AgCl reference electrode.

FIG. 12 shows a cyclic voltammogram for 5 mM 4-NH$_2$-TEMPO (right) in 1.0 M sulfuric acid aqueous solution using glassy carbon as working electrode. The scan rate was 5 mV/s, from 0 V to 1.2 V versus Ag/AgCl reference electrode. The arrow in the cyclic voltammogram plot indicates an irreversible reduction of 4-NH$_2$-TEMPO:

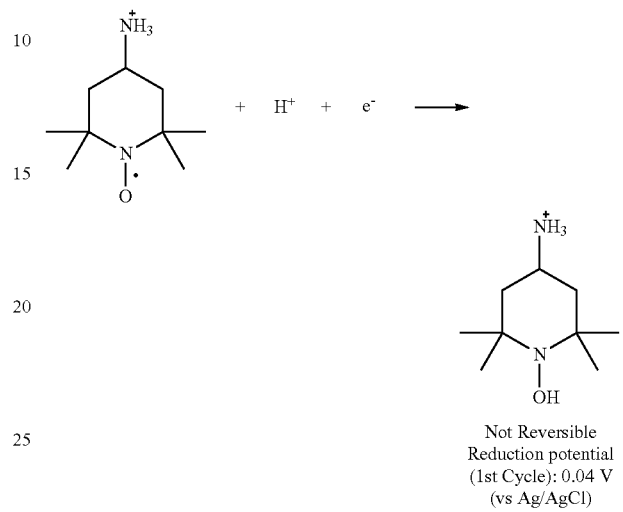

Not Reversible
Reduction potential
(1st Cycle): 0.04 V
(vs Ag/AgCl)

As is evident from the data in FIG. 9 and FIG. 10, 4-NH$_2$-TEMPO exhibited an oxidation potential of 0.92 V (vs. AG/AgCl), which is 0.09 V higher than 4-OH-TEMPO (0.83 V vs. AG/AgCl). In addition, 4-NH$_2$-TEMPO has higher solubility than 4-OH-TEMPO under acidic conditions. The data in FIG. 11 and FIG. 12 indicate that cycling up to about 1.2 volt results in some irreversible side reactions, and that 4-NH$_2$-TEMPO exhibits greater redox stability (i.e., less severe irreversible side reactions) than 4-OH-TEMPO.

EXAMPLE 4

Electrochemical Evaluation of Amino-Substituted Phenol Compounds

The electrochemical properties of 4-dimethylaminophenol (DMAP) and 5-(dimethylamino)-2-hydroxybenzene-1,3-disulfonic acid (DADPS) were evaluated by cyclic voltammetry, the diffusion coefficient of DMAP was determined, and bulk electrolysis of DMAP and DADPS were evaluated, all by the methods described in Example 1.

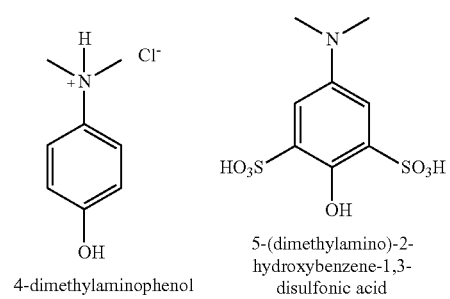

4-dimethylaminophenol 5-(dimethylamino)-2-hydroxybenzene-1,3-disulfonic acid

Figure 13:
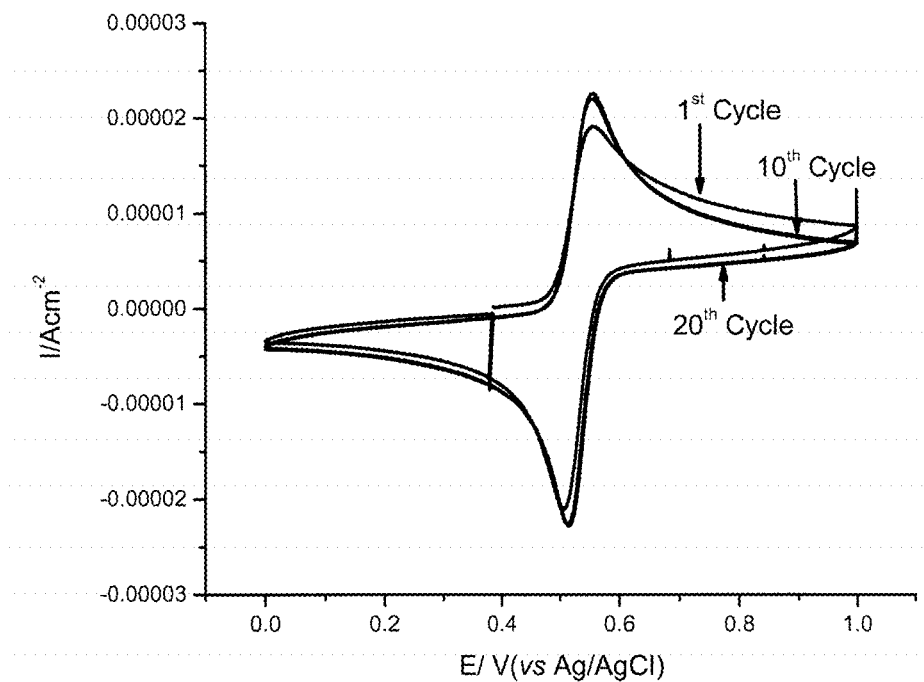
FIG. 13 shows $1^{st}$, $10^{th}$ and $20^{th}$ cyclic voltammograms for 1 mM 4-dimethylaminophenol (DMAP) in 0.5 M sulfuric acid aqueous solution using glassy carbon as working electrode. The scan rate was 20 mV/s, from 0 V to 1 V versus Ag/AgCl reference electrode.

FIG. 13 shows 1$^{st}$, 10$^{th}$ and 20$^{th}$ cyclic voltammograms for 1 mM DMAP in 0.5 M sulfuric acid aqueous solution using glassy carbon as working electrode. The scan rate was 20 mV/s, from 0 V to 1 V versus Ag/AgCl reference electrode. The observed oxidation potential was 0.56 V (vs. AG/AgCl).

Figure 14:
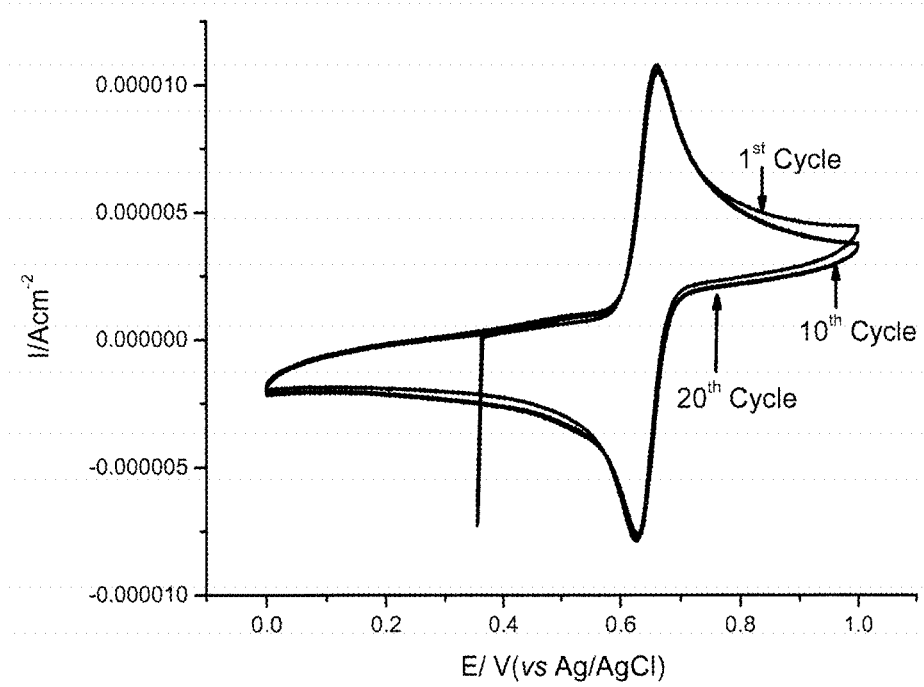
FIG. 14 shows 1st, 10th and 20th cyclic voltammograms for 1 mM 5-(dimethylamino)-2-hydroxybenzene-1,3-disulfonic acid (DADPS) in 0.5 M sulfuric acid aqueous solution using glassy carbon as working electrode. The scan rate was 20 mV/s, from 0 V to 1 V versus Ag/AgCl reference electrode.

FIG. 14 shows $1^{st}$, $10^{th}$ and $20^{th}$ cyclic voltammograms for 1 mM DADPS in 0.5 M sulfuric acid aqueous solution using glassy carbon as working electrode. The scan rate was 20 mV/s, from 0 V to 1 V versus Ag/AgCl reference electrode. The observed oxidation potential was 0.66 V (vs. AG/AgCl).

Figure 15:
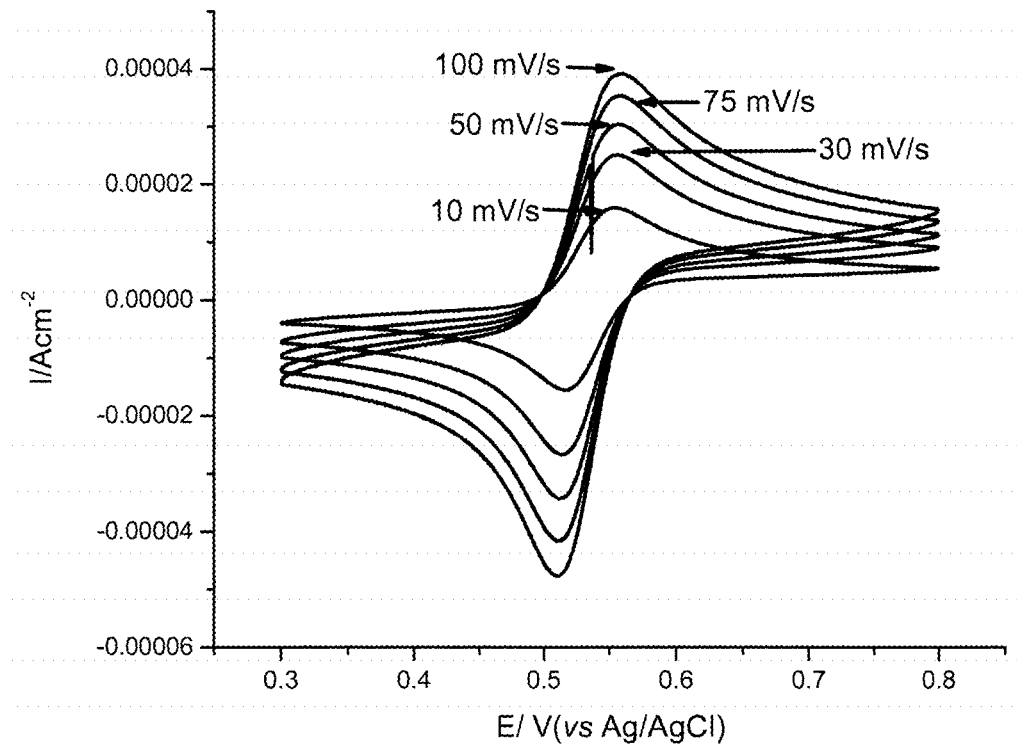
FIG. 15 shows cyclic voltammogram profiles for 1 mM 4-dimethylaminophenol dissolved in 0.5 M sulfuric acid aqueous solution measured using glassy carbon as working electrode. The scan rate was 10 mV/s, 30 mV/s, 50 mV/s, 75 mV/s and 100 mV/s from 0.3 V to 0.8 V versus Ag/AgCl reference electrode.

FIG. 15 shows cyclic voltammogram profiles for 1 mM 4-dimethylaminophenol dissolved in 0.5 M sulfuric acid aqueous solution measured using glassy carbon as working electrode. The scan rate was 10 mV/s, 30 mV/s, 50 mV/s, 75 mV/s and 100 mV/s from 0.3 V to 0.8 V versus Ag/AgCl reference electrode.

Figure 16:
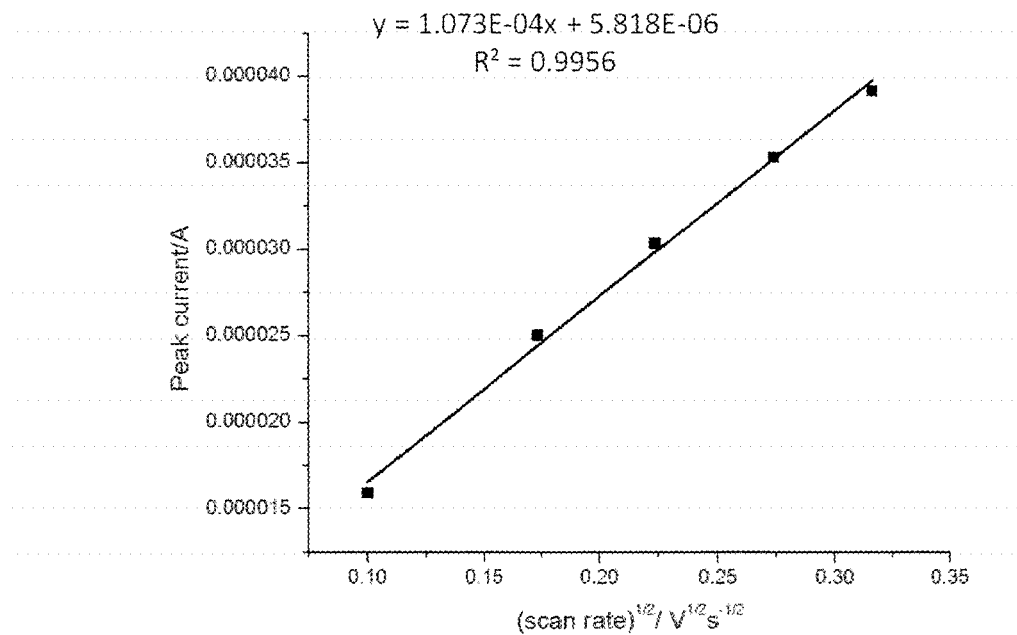
FIG. 16 shows a plot of peak current versus the square root of the scan rate for the cyclic voltammograms of 1 mM 4-dimethylaminophenol in 0.5 M sulfuric acid. Diffusion coefficient was calculated using the Randle-Sevcik equation. The diffusion coefficient of the aminophenol is similar to that of vanadium compounds, indicating its high rate capacity as a catholyte material.

FIG. 16 shows a plot of peak current versus the square root of the scan rate for the cyclic voltammograms of 1 mM 4-dimethylaminophenol in 0.5 M sulfuric acid. The diffusion coefficient was calculated to be $3.9 \times 10^{-6}$ cm$^2$/s. using the Randle-Sevcik equation, which is similar to vanadium ion.

FIG. 17 shows voltage profiles for the bulk electrolysis of 1 mM DMAP (dashed line) and 1 mM DADPS (solid line) in 3.0 M sulfuric acid using constant current of 2.68 mA with a cut-off voltage from 0.25 V to 0.85 V versus Ag/AgCl reference electrode.

FIG. 18 shows bulk electrolysis cycling performance data for DMAP and DADPS showing plots of capacity vs. cycle number (left axis) and coulombic efficiency (right axis).

As the data in FIGS. 13-18 show, each of the 4-amino-substituted phenol compounds tested demonstrated good cycling stability and excellent solubility in aqueous acid. The diffusion coefficient of 4-dimethylaminophenol indicates a high rate capacity as a catholyte material. The bulk electrolysis data in FIG. 17 and FIG. 18 demonstrate that a flow cell utilizing an amino-substituted phenol bearing electron withdrawing groups (e.g., sulfonic acid groups), such as DMAPS, exhibits an increased potential relative to a corresponding a flow cell utilizing an unsubstituted aminophenol (e.g., DMAP).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments of the invention in which an exclusive property or privilege is claimed are defined as follows:

1. An aqueous redox flow battery comprising:
   (a) an anode within an anolyte chamber;
   (b) a cathode within a catholyte chamber;
   (c) an anolyte comprising an acidic solution of a first acid-soluble redox reactant;
   (b) a catholyte comprising an acidic solution of a second acid-soluble redox reactant;
   (e) an ion-permeable separator membrane forming at least a portion of a common wall between the anolyte chamber and the catholyte chamber;
   wherein:
   the anolyte contacts the anode and the separator membrane when circulated through the anolyte chamber;
   the catholyte contacts the cathode and the separator membrane when circulated through the catholyte chamber;
   during charging and discharging the anolyte and catholyte are circulated over the anode and cathode, respectively, while cations from the anolyte and catholyte shuttle through the separator membrane to balance the charges that develop as a result of oxidation and reduction of the first and second acid-soluble redox reactants;
   the first acid-soluble redox reactant has a lower redox potential than the second acid-soluble redox reactant;
   and wherein the second acid-soluble redox reactant comprises a compound selected from the group consisting of 1-dimethylamino-4-hydroxybenzene and 1-dimethylamino-4-hydroxy-benzene-3,5-disulfonic acid.

2. The aqueous redox flow battery of claim 1, wherein the first acid-soluble redox reactant is present in the anolyte at a concentration in the range of about 0.001 molar (M) to about 5 M.

3. The aqueous redox flow battery of claim 1, wherein the second acid-soluble redox reactant is present in the catholyte at a concentration in the range of about 0.001 M to about 5 M.

4. The aqueous redox flow battery of claim 1, wherein the first acid-soluble redox reactant is dissolved in an aqueous acid selected from the group consisting of sulfuric acid, phosphoric acid, hydrochloric acid, citric acid, acetic acid, and a combination of two or more thereof.

5. The aqueous redox flow battery of claim 1, wherein the second acid-soluble redox reactant is dissolved in an aqueous acid selected from the group consisting of sulfuric acid, phosphoric acid, hydrochloric acid, citric acid, acetic acid, and a combination of two or more thereof.

6. The aqueous redox flow battery of claim 1, wherein the first acid-soluble redox reactant is selected from the group consisting of 9,10-anthraquinone-2,6-disulfonic acid, an anthraquinone-2,7-disulfonic acid salt, an anthraquinone-2-sulfonic acid salt, anthraflavic acid, methyl viologen, and vanadium ion.

* * * * *

UNITED STATES PATENT AND TRADEMARK OFFICE
CERTIFICATE OF CORRECTION

| | |
|---|---|
| PATENT NO. | : 10,553,890 B2 |
| APPLICATION NO. | : 15/631239 |
| DATED | : February 4, 2020 |
| INVENTOR(S) | : Zhengcheng Zhang, Chi Cheung Su and Lei Cheng |

Page 1 of 1

It is certified that error appears in the above-identified patent and that said Letters Patent is hereby corrected as shown below:

In the Claims

Claim 1, Column 18, Line 32, delete "(b)" and insert --(d)--.

Signed and Sealed this
Thirty-first Day of March, 2020

Andrei Iancu
*Director of the United States Patent and Trademark Office*